United States Patent
Shin et al.

(10) Patent No.: US 12,511,242 B2
(45) Date of Patent: Dec. 30, 2025

(54) DATA STORAGE DEVICES USING NON-VOLATILE MEMORY DEVICES AND OPERATING METHODS THEREOF

(71) Applicant: Samsung Electronics Co., Ltd., Suwon-si (KR)

(72) Inventors: Joonhyuck Shin, Suwon-si (KR); Suhwan Kim, Suwon-si (KR); Kilmo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 18/052,344

(22) Filed: Nov. 3, 2022

(65) Prior Publication Data

US 2023/0141861 A1 May 11, 2023

(30) Foreign Application Priority Data

Nov. 10, 2021 (KR) .......................... 10-2021-0154271
May 24, 2022 (KR) .......................... 10-2022-0063591

(51) Int. Cl.
*G06F 12/14* (2006.01)
*G06F 3/06* (2006.01)
*G06F 12/02* (2006.01)
*G06F 13/28* (2006.01)

(52) U.S. Cl.
CPC ........ *G06F 12/1408* (2013.01); *G06F 3/0623* (2013.01); *G06F 3/0637* (2013.01); *G06F 3/0656* (2013.01); *G06F 3/0679* (2013.01); *G06F 12/0246* (2013.01); *G06F 13/28* (2013.01)

(58) Field of Classification Search
CPC .. G06F 12/1408; G06F 3/0623; G06F 3/0637; G06F 3/0656; G06F 3/0679; G06F 12/0246; G06F 13/28
See application file for complete search history.

(56) References Cited

U.S. PATENT DOCUMENTS

| | | |
|---|---|---|
| 10,025,728 B2 | 7/2018 | Canter |
| 10,817,214 B2 | 10/2020 | Park et al. |
| 2003/0202658 A1* | 10/2003 | Verbauwhede ....... H04L 9/0631 380/43 |

(Continued)

FOREIGN PATENT DOCUMENTS

KR 20170136409 A 12/2017

*Primary Examiner* — Prasith Thammavong
(74) *Attorney, Agent, or Firm* — Wolf, Greenfield & Sacks, P.C.

(57) ABSTRACT

An operating method of a data storge device including a buffer memory, a non-volatile memory, and a controller, includes receiving, from a host, an encryption request for data stored in the buffer memory, and performing an encryption operation in response to the encryption request, wherein the performing of the encryption operation comprises performing a program operation, the performing of the program operation comprises receiving a physical address of a buffer region of the non-volatile memory, generating encrypted data by causing an encryption module included in the controller to be in an on state to encrypt the data stored in the buffer memory, and programming the encrypted data in the buffer region of the non-volatile memory based on the physical address.

20 Claims, 15 Drawing Sheets

(56) References Cited

U.S. PATENT DOCUMENTS

| | | |
|---|---|---|
| 2008/0192928 A1* | 8/2008 | Yu .......................... G06F 21/85 |
| | | 711/E12.098 |
| 2010/0128874 A1* | 5/2010 | Scott-Nash ............... H04L 9/14 |
| | | 380/255 |
| 2015/0089246 A1* | 3/2015 | Kanai ................. G06F 12/1491 |
| | | 713/193 |
| 2016/0026582 A1 | 1/2016 | Thompson |
| 2016/0239685 A1 | 8/2016 | Li et al. |
| 2017/0185529 A1* | 6/2017 | Chhabra ............... G06F 12/145 |
| 2019/0004942 A1* | 1/2019 | Fujii ..................... G06F 3/0689 |
| 2020/0150895 A1 | 5/2020 | Kim et al. |
| 2021/0073404 A1 | 3/2021 | Sakata et al. |
| 2021/0232694 A1* | 7/2021 | Jannyavula Venkata .................... |
| | | G06F 21/602 |
| 2022/0300198 A1* | 9/2022 | Gao .................... G06F 11/3466 |

* cited by examiner

DATA STORAGE DEVICES USING NON-VOLATILE MEMORY DEVICES AND OPERATING METHODS THEREOF

CROSS-REFERENCE TO RELATED APPLICATIONS

This application is based on and claims priority under 35 U.S.C. § 119 to Korean Patent Application No. 10-2021-0154271, filed on Nov. 10, 2021, and Korean Patent Application No. 10-2022-0063591, filed on May 24, 2022, in the Korean Intellectual Property Office, the disclosures of which are incorporated by reference herein in their entireties.

BACKGROUND

The present disclosure relates generally to data storage devices and particularly to non-volatile memory devices and operating methods thereof. For example, methods of encrypting and decrypting data by using an encryption intellectual property (IP), and a data storage device including the encryption IP, may be provided.

A data storage device, such as a solid state drive (SSD) that supports a self-encryption device (SED), may program user data as encrypted data in a non-volatile memory, such as a NAND flash memory. When an encryption request or a decryption request is received from a host, data stored in a dynamic random access memory (DRAM) may also be encrypted or decrypted. There may be an encryption request and/or a decryption request of a host or so on even during runtime of a data storage device. In addition, a separate module may be provided for encrypted data of a DRAM, and in this case, when the separate module is between a central processing unit (CPU) and the DRAM, an operation speed of a system may be reduced.

SUMMARY

Example embodiments of the invention provide an operating method of a device that enables encryption and decryption to be performed at an increased speed even during the runtime of the device without adding a separate hardware module and enables encryption and decryption freely according to a request of a host.

According to an aspect of the invention, an operating method of a data storge device including a buffer memory, a non-volatile memory, and a controller, includes receiving, from a host, an encryption request for data stored in the buffer memory, and performing an encryption operation in response to the encryption request, wherein the performing of the encryption operation includes performing a program operation, and the performing of the program operation includes receiving a physical address of a buffer region of the non-volatile memory, generating encrypted data by causing an encryption module included in the controller to be in an on state to encrypt the data stored in the buffer memory, and programming the encrypted data in the buffer region of the non-volatile memory based on the physical address.

According to another aspect of the invention, an operating method of a data storage device including a buffer memory, a non-volatile memory, and a controller, includes receiving, from a host, a decryption request for encrypted data stored in the buffer memory, performing a decryption operation in response to the decryption request, wherein the performing of the decryption operation includes receiving a physical address of a buffer region of the non-volatile memory, causing an encryption module included in the controller to be in an off state, programming the encrypted data in the buffer region of the non-volatile memory based on the physical address, causing the encryption module to be in an on state, generating decrypted data by reading and decrypting the encrypted data from the buffer region of the non-volatile memory, and storing the decrypted data in the buffer memory.

According to another aspect of the invention, a data storage device includes a buffer memory, a non-volatile memory, and a controller configured to receive an encryption request for data stored in the buffer memory from a host and to control an encryption operation in response to the received encryption request, wherein, during the encryption operation, a physical address of a buffer region of the non-volatile memory is received, encrypted data is generated by causing an encryption module included in the controller to be in an on state to encrypt the data stored in the buffer memory, the encrypted data is programmed in the buffer region of the non-volatile memory based on the physical address, the encrypted data is read from the buffer region of the non-volatile memory by causing the encryption module to be in an off state, and the read encrypted data is stored in the buffer memory.

BRIEF DESCRIPTION OF THE DRAWINGS

Embodiments of the invention will be more clearly understood from the following detailed description taken in conjunction with the accompanying drawings in which.

DETAILED DESCRIPTION

Description will be made in detail with reference to embodiments of the invention, and examples thereof are illustrated in the accompanying drawings.

Figure 1:
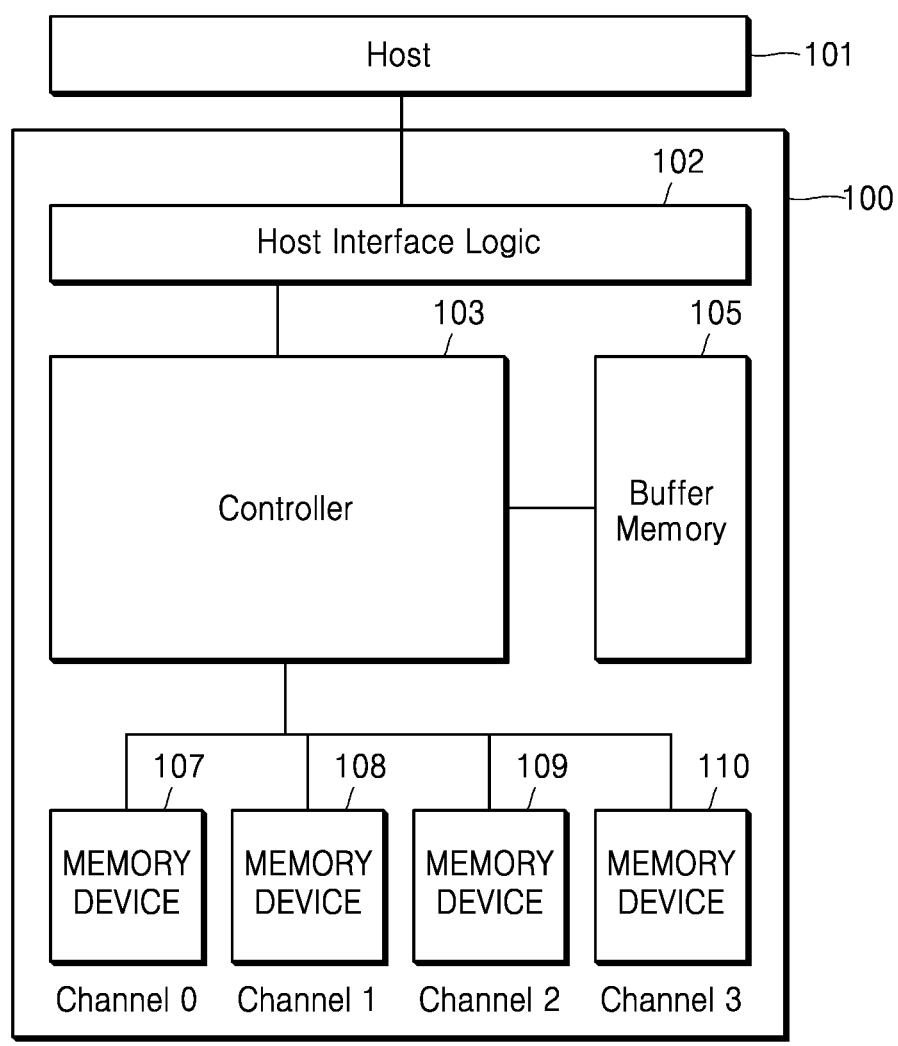
FIG. 1 is a schematic block diagram illustrating a structure of a data storage device according to an example embodiment of the invention.

FIG. 1 is a diagram illustrating a structure of a data storage device 100 according to an example embodiment of the invention.

Referring to FIG. 1, the data storage device 100 may include a storage device that is connected to a host 101 and performs/fulfills (e.g., responds to) a request from the host 101. As illustrated in FIG. 1, the data storage device 100 may include a host interface logic 102, memory devices 107, 108, 109, and 110, a buffer memory 105, and a controller 103.

The data storage device 100 may store data according to control by the host 101, such as a mobile phone, a smartphone, a motion picture experts group (MPEG) audio layer-3 (MP3) player, a laptop computer, a desktop computer, a game machine, a television (TV), a tablet personal computer (PC), or an in-vehicle infotainment system.

The data storage device 100 may be manufactured as any one of various types of storage devices including a host interface that performs a method of communicating with the host 101. For example, the data storage device 100 may include any one of various types of storage devices, such as a multimedia card in the form of a solid state drive (SSD), a multimedia card (MMC), an embedded MMC (eMMC), a reduced-size MMC, and a micro-MMC, a secure digital (SD) card in the form of an SD card, a mini-SD card, and a micro-SD card, a universal storage bus (USB) storage device, a universal flash storage (UFS) device, a personal computer memory card international association (PCMCIA) card-type storage device, a peripheral component interconnection (PCI) card-type storage device, a PCI express (PCIe) card-type storage device, a compact flash (CF) card, a smart media card, and a memory stick.

The data storage device 100 may be manufactured as any one of various types of packages. For example, the data storage device 100 may be manufactured as any one of various types of packages, such as a package on package (POP), a system in package (SIP), a system on chip (SOC) package, a multi-chip package (MCP), a chip on board (COB) package, a wafer-level fabricated package (WFP), and a wafer-level stack package (WSP).

The host 101 may communicate with the data storage device 100 by using at least one of various communication methods, such as universal serial bus (USB), serial advanced technology attachment (SATA), serial attached SCSI (SAS), high speed interchip (HSIC), small computer system interface (SCSI), PCI, (PCIe, non-volatile memory express (NVMe), UFS, SD, MMC, eMMC, dual in-line memory module (DIMM), registered DIMM (RDIMM), and load reduced DIMM (LRDIMM).

The host interface logic 102 (which may be referred to as a host interface, a host interface layer, or so on) may manage communication between the data storage device 100 and other components. The communication may include read requests for reading data from the data storage device 100 and write requests for writing data to the data storage device 100. The host interface logic 102 may manage interfaces through only one port or may manage the interfaces through multiple ports. Alternatively, the data storage device 100 may include multiple ports, each of which may have a separate host interface logic 102 to manage interfaces through the multiple ports. Embodiments of the invention may also combine the possibilities (for example, a data storage device having three ports includes a first host interface logic to manage one port and a second host interface logic to manage the other two ports).

The memory devices 107, 108, 109, and 110 may store data. The memory devices 107, 108, 109, and 110 operate based on the control of the controller 103. The memory devices 107, 108, 109, and 110 may each include a memory cell array (not illustrated) including a plurality of memory cells for storing data.

In an example embodiment, the memory devices 107, 108, 109, and 110 may each include double data rate synchronous dynamic random access memory (DDR SDRAM), low power double data rate4 (LPDDR4) SDRAM, graphics double data rate (GDDR) SDRAM, low power DDR (LPDDR), rambus dynamic random access memory (RDRAM), a NAND flash memory, a vertical NAND memory, NOR flash memory, resistive random access memory (RRAM), phase-change random access memory (PRAM), magnetoresistive random access memory (MRAM), ferroelectric random access memory (FRAM), spin transfer torque random access memory (STT-RAM), or so on. In the present specification, for the sake of convenience of description, it is assumed that the memory devices 107, 108, 109, and 110 are NAND flash memories.

The memory devices 107, 108, 109, and 110 may each receive a command and an address from the controller 103 and access a region of a memory cell array, which is selected by the address. The memory devices 107, 108, 109, and 110 may each perform an operation indicated by the command for the region selected by the address. For example, the memory devices 107, 108, 109, and 110 may each perform a program operation (a write operation), a read operation, and an erase operation. During a program operation, the memory devices 107, 108, 109, and 110 may program data in a region selected by an address. In a read operation, the memory devices 107, 108, 109, and 110 may read data from the region selected by the address. During the erase operation, the memory devices 107, 108, 109, and 110 may erase data stored in a region selected by an address.

The controller 103 may control all operations of the data storage device 100 or in response to a request from the host 101.

When power is applied to the data storage device 100, the controller 103 may execute firmware. When the memory devices 107, 108, 109, and 110 are flash memory devices, the firmware may include the host interface logic 102 that controls communication with the host 101, and the controller 103 may include a flash translation layer (FTL) for controlling communication between the host 101 and the memory devices 107, 108, 109, and 110 and a flash interface layer (FIL) for controlling communication with the memory devices 107, 108, 109, and 110.

The controller 103 may control the memory devices 107, 108, 109, and 110 to perform a program operation, a read operation, or an erase operation according to (e.g., in response to) a request of the host 101. During the program operation, the controller 103 may provide a write command, a physical block address, and data to the memory devices 107, 108, 109, and 110. During a read operation, the controller 103 may provide a read command and a physical block address to the memory devices 107, 108, 109, and 110. During an erase operation, the controller 103 may provide an erase command and a physical block address to the memory devices 107, 108, 109, and 110.

In an example embodiment, the controller 103 may itself generate a command, an address, and data regardless of (e.g., independently of) a request from the host 101 and transmit the command, the address, and the data to the memory devices 107, 108, 109, and 110. For example, the controller 103 may provide the memory devices 107, 108, 109, and 110 with commands, addresses, and data used/required to perform a read operation and a program operation for performing wear leveling, read reclaim, garbage collection, and so on.

In some embodiments, the controller 103 may control at least two of the memory devices 107, 108, 109, and 110. In this case, the controller 103 may control the memory devices 107, 108, 109, and 110 according to an interleaving manner in order to improve operational performance. The interleaving manner may include a method of controlling operations of at least two of the memory devices 107, 108, 109, 110 in parallel or to overlap each other. The interleaving manner may be performed in units of channels (channel 0, channel 1, channel 2, and channel 3).

A read request provided from the host 101 is a request for the host 101 to provide (e.g., provide again) original data requested to be stored in the data storage device 100. The controller 103 performs error correction encoding on the original data to generate write data including parity data for error correction. The controller 103 may control the memory devices 107, 108, 109, and 110 to store the write data in the memory devices 107, 108, 109, and 110.

Thereafter, according to a read request from the host 101, the controller 103 may provide the memory devices 107, 108, 109, and 110 with a read command and physical addresses indicating locations of memory cells in which data to be read is stored, in order to obtain data corresponding to the read request of the host 101 from the memory devices 107, 108, 109, and 110.

The memory devices 107, 108, 109, and 110 may provide the controller 103 with data stored at the received physical address and read by using a read voltage. The read voltage may be applied to identify data stored in memory cells. The controller 103 may perform error correction decoding on the read data.

The buffer memory 105 may include a volatile memory device. Accordingly, when power is disconnected, data stored in the buffer memory 105 may not be maintained. For example, the buffer memory 105 may include a dynamic random access memory (DRAM).

The controller 103 may control the buffer memory 105 to temporarily store data to be stored in the memory devices 107, 108, 109, and 110 according to (e.g., in response to) a request from the host 101. Data stored in the buffer memory 105 may be stored in a region (not illustrated) previously allocated in the buffer memory 105 according to (e.g., using) a logical address.

The size of data input to the memory devices 107, 108, 109, and 110 by one program operation may be referred to as a program unit. The size of data input according to (e.g., in response to) a program request received from the host 101 may be different from program units of the memory devices 107, 108, 109, and 110. Accordingly, the controller 103 may store data received according to the program request of the host 101 in the buffer memory 105. Thereafter, when the size of data stored in the buffer memory 105 becomes unit of program (e.g., a program unit), the controller 103 may control the buffer memory 105 and the memory devices 107, 108, 109, and 110 to program the data in the memory devices 107, 108, 109, and 110. Referring to FIG. 1, the buffer memory 105 is illustrated to be included in the data storage device 100 and to be outside the controller 103 but is not limited thereto. In various embodiments, the buffer memory 105 may be inside the controller 103.

Figure 2:
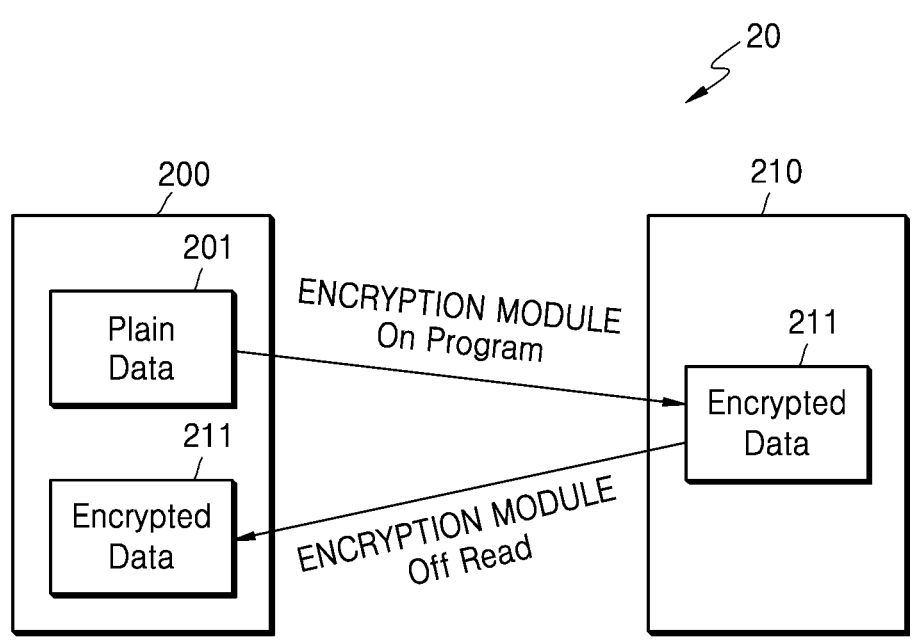
FIG. 2 is a conceptual block diagram illustrating an encryption operation of an operating method of a data storage device, according to an example embodiment of the invention.

FIG. 2 is a conceptual diagram illustrating an encryption operation in an operating method of a data storage device according to an example embodiment of the invention.

Referring to FIG. 2, a data storage device 20 may include a first memory 200 and a second memory 210. For example, the data storage device 20 may correspond to (e.g., may be) an example of the data storage device 100 of FIG. 1. The data storage device 20 may enable data stored in the first memory 200 to be encrypted by using encryption modules to be described below, according to (e.g., in response to) an external request (for example, the host 101) or as needed (for example, according to the need of firmware). In some embodiments, the first memory 200 and the second memory 210 may include buffer memories but are not limited thereto. In the present specification, for the sake of convenience of description, it is assumed that memories corresponding to the first memory 200 and the second memory 210 are buffer memories.

In some embodiments, the first memory 200 may receive data from an external device based on an address corresponding to a region of the second memory 210 as described below or may transmit plain data 201 stored in the first memory 200 to the second memory 210. In a process of transmitting data, an encryption module, which is included in the data storage device 20, may be utilized. When the encryption module is in an on state, the plain data 201 transmitted from the first memory 200 may be encrypted through an encryption algorithm (for example, advanced encryption standard (AES)) of the encryption module. That is, the plain data 201 may be encrypted before being programmed in the second memory 210 during the transmission process. Encrypted data 211 encrypted by the encryption module in an on-state may be programmed in the second memory 210 based on a command.

In some embodiments, before the encrypted data 211 is read from the second memory 210, an encryption module that encrypts the plain data 201 may be in an off state. The encrypted data 211 programmed in the second memory 210 may be read based on a command. The encrypted data 211 read from the second memory 210 may be transmitted to the first memory 200. As a result, the plain data 201 of the first memory 200 may be encrypted as the encrypted data 211 by using an encryption module included in the data storage device 20 without the need to newly add a separate module for encryption.

Figure 3:
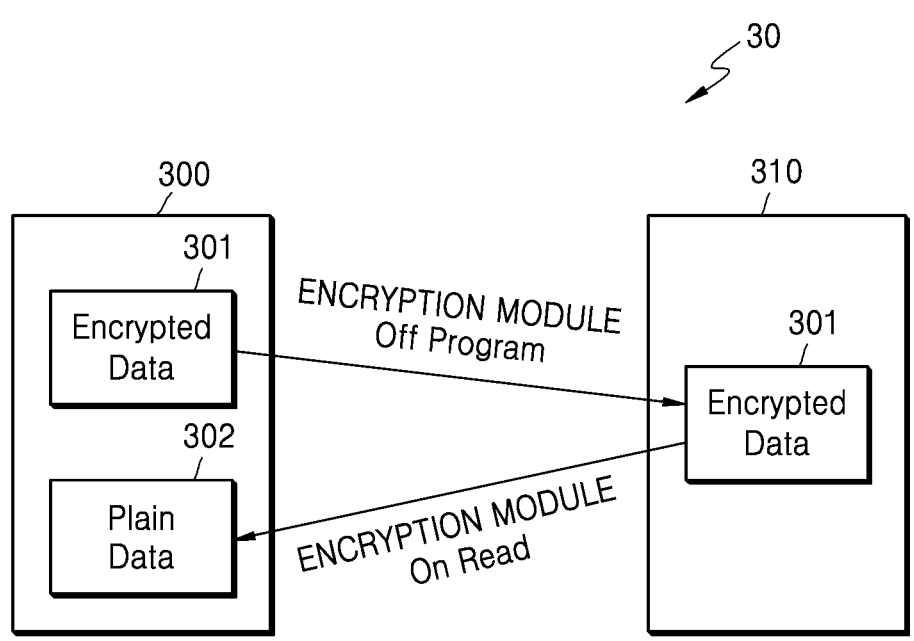
FIG. 3 is a conceptual diagram illustrating a decryption operation of an operating method of a data storage device, according to an example embodiment of the invention.

FIG. 3 is a conceptual diagram illustrating a decryption operation in an operating method of a data storage device according to an example embodiment of the invention.

Referring to FIG. 3, a data storage device 30 may include a first memory 300 and a second memory 310. For example, the data storage device 30 may correspond to (e.g., may be) an example of the data storage device 100 of FIG. 1. The data storage device 30 may enable encrypted data stored in the first memory 300 to be decrypted by using encryption modules to be described below, according to an external request (for example, the host 101) or as needed (for example, according to the need of firmware). As described above, in some embodiments, the first memory 300 and the second memory 310 may each include a buffer memory.

In some embodiments, the first memory 300 may receive encrypted data 301 from an external device based on an address corresponding to the second memory 310 as described below or may transmit the encrypted data 301 stored in the first memory 300 to the second memory 310. In a process of transmitting the encrypted data 301, when the encryption module is in an off state, the encrypted data 301 transmitted from the first memory 300 may be received by the second memory 310 without a decryption process. That is, the encrypted data 301 transmitted from the first memory 300 may be programmed in the second memory 310 as it is based on a command.

In some embodiments, in a process of transmitting the encrypted data 301 from the second memory 310 to the first memory 300, an encryption module, which is included in the data storage device 30, may be used. Before the encrypted data 301 is read from the second memory 310, the encryption module may be in an on state. The programmed encrypted data 301 may be read based on a command. In the process of reading and transmitting encrypted data, the encrypted data may be decrypted by using an encryption algorithm (for example, an AES) of the encryption module. That is, the encrypted data 301 may be decrypted before being stored in the first memory 300 during the transmission process. As a result, the encrypted data 301 of the first memory 300 may be decrypted into plain data 302 by using an encryption module included in the data storage device 30 without the need to newly add a separate module for decryption.

Figure 4:
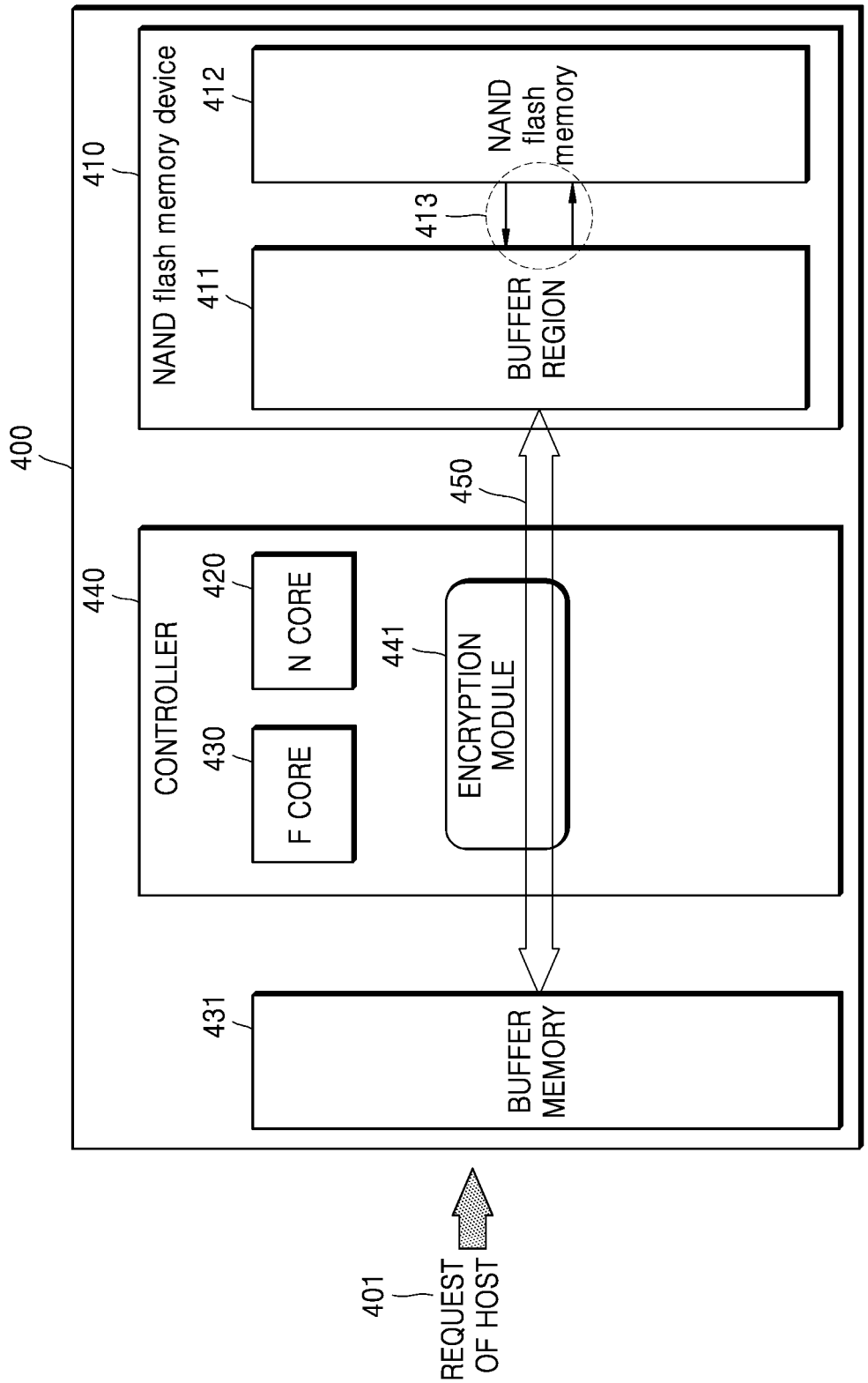
FIG. 4 is a diagram specifically illustrating a structure of the data storage device of FIG. 1, according to an example embodiment of the invention.

FIG. 4 is a diagram specifically illustrating a structure of the data storage device of FIG. 1 according to an example embodiment of the invention.

Referring to FIG. 4, a data storage device 400 may include a memory device 410 (hereinafter, referred to as a NAND flash memory device for the sake of convenience of description, as described above), a buffer memory 431, and a controller 440. The memory device 410 may include a buffer region 411 and a NAND flash memory 412. The controller 440 may include an N core 420, an F core 430, and an encryption module 441 corresponding to (e.g., communicatively coupled to) the NAND flash memory device 410. The buffer memory 431 may be connected to the buffer region 411 through a channel 450. In some embodiments, the buffer region 411 may include a page buffer included in the non-volatile memory.

The buffer memory 431 may include a DRAM buffer memory but is not limited thereto and may include various types of buffer memories. In addition, in the drawings and the present specification, the buffer region 411 is referred to as the buffer region 411 of NAND flash memory for the sake of convenience of description as described above but is not limited thereto. That is, the buffer region 411 of NAND flash memory may include various types of buffer memories. For example, the buffer region 411 of NAND flash memory may include a separate memory located outside the NAND flash memory device 410.

The N core 420 may be included in the controller 440 as illustrated in FIG. 4. The N core 420 may control all operations of the F core 430, the controller 440, and the NAND flash memory device 410. The N core 420 may include a central processing unit (CPU). The N core 420 may provide commands for an encryption operation and/or a decryption operation according to (e.g., in response to) a request or a need of the host 101. In FIG. 4, the N core 420 is included in the controller 440 but is not limited thereto.

That is, the N core 420 may be outside the controller 440 and may be connected to the controller 103 and/or the F core 430 through a bus.

In some embodiments, the N core 420 may access a valid data buffer included in the buffer memory 431. The F core 430 may provide the N core 420 with an address for a memory region of the buffer memory 431. The N core 420 may access the buffer memory 431 through the controller 440 and the channel 450 based on its corresponding address. In addition, the N core 420 may receive a physical address physically stored in the NAND flash memory device 410 from the NAND flash memory device 410. The N core 420 may provide the physical address to the controller 440. The controller 440 may access the buffer region 411 of NAND flash memory through the channel 450 based on its corresponding physical address.

The N core 420 may request encryption and/or decryption of data by dividing the valid data buffer of the buffer memory 431 into units of direct memory access (DMA). Similarly, access to the buffer region 411 of NAND flash memory may be divided into DMA units. As described above, because the existing program/read/erase requests may be made through the channel 450, the N core 420 and/or the controller 440 may additionally request encryption and/or decryption functions of data by using a method to be described below.

For example, the N core 420 may receive an address of a data buffer from the buffer memory 431 (for example, a data buffer of an FTL, a DRAM buffer, or so on) of the F core 430, divide the data buffer into DMA units, and perform encryption and/or decryption by using the encryption module 441 through the controller 440.

In some embodiments, the NAND flash memory device 410 may include the buffer region 411 of NAND flash memory and the NAND flash memory 412. As described above, the buffer region 411 of NAND flash memory is not limited thereto and may include a separate buffer memory located outside the NAND flash memory device 410. The buffer region 411 of NAND flash memory may transmit and receive data to and from the buffer memory 431 through the channel 450. In addition, the buffer region 411 of NAND flash memory may program data in the NAND flash memory 412 or read data from the NAND flash memory 412.

In FIG. 4, the F core 430 is in the controller 440 but is not limited thereto. That is, the F core 430 may be outside the controller 440 and may be connected to the controller 103 and/or the N core 420 through a bus.

In some embodiments, when at least one of an encryption request and a decryption request is generated by the F core 430 according to a request 401 of a host, the N core 420 may determine whether the request is an encryption request or a decryption request. The buffer memory 431 may include a DRAM buffer as described above, and the F core 430 may provide a data buffer address of the buffer memory 431 to the N core 420. The N core 420 may perform encryption and/or decryption according to (e.g., in response to) the request 401 of a host for encryption and/or decryption through the controller 440, the encryption module 441, the buffer region 411 of NAND flash memory, and the channel 450 to be described below.

An operation of the channel 450 may be based on the control of the controller 440. The channel 450 may be a unit through which data moves. In addition, the channel 450 may interact with several modules, such as the encryption module 441, during data transmission.

In some embodiments, data transmission and reception between the buffer memory 431 and the buffer region 411 of NAND flash memory may be performed through the channel 450. For example, the channel 450 may program data stored in the buffer memory 431 in the buffer region 411 of NAND flash memory based on the control of the controller 440. In addition, for example, the channel 450 may read the data programmed in the buffer region 411 of NAND flash memory and store the data in the buffer memory 431, based on the control of the controller 440. However, the invention is not limited thereto, and data transmission and reception between the buffer memory 431 and the NAND flash memory device 410 may also be performed through the channel 450.

In addition, it will be apparent that requests of program, read, and erase may be performed through the channel 450 as described above. That is, because the above requests for an operation between memories (for example, the buffer memory 431, the buffer region 411 of NAND flash memory, or so on) may be performed through the channel 450, at least one of a data encryption request and a data decryption request may be performed through the channel 450 by a method to be described below.

The controller 440 may include the N core 420 and the F core 430. However, as described above, at least one of the N core 420 and the F core 430 may be outside the controller 440 and may be connected to the controller 440 through a bus. In addition, the controller 440 may control an operation of the channel 450.

In some embodiments, the controller 440 may receive a physical address of the buffer region 411 of NAND flash memory from the N core 420 as described above. The controller 440 may access the buffer region 411 of NAND flash memory through the channel 450 based on a corresponding physical address. The controller 440 may program the data stored in the buffer memory 431 in the buffer region 411 of NAND flash memory based on a physical address through the channel 450.

In some embodiments, the controller 440 may read data in the buffer region 411 of NAND flash memory through the channel 450. In addition, the controller 440 may store the data read from the buffer region 411 of NAND flash memory in the buffer memory 431 through the channel 450.

In some embodiments, the controller 440 may encrypt plain data and/or decrypt the encrypted data by using the encryption module 441 and the channel 450. The controller 440 may include the encryption module 441 corresponding to the NAND flash memory device 410 and may control the encryption module 441 to be in an on state or an off state. The controller 440 may include various modules or integrated circuits (ICs) (for example, write encapsulation, write decapsulation, error correction code (ECC) encoding, read encapsulation, read decapsulation, or ECC decoding modules or ICs) in addition to the encryption module 441.

In some embodiments, the encryption module 441 may correspond to the NAND flash memory device 410. The encryption module 441 may be between the buffer memory 431 and the buffer region 411 of NAND flash memory to perform a function. However, a position of the encryption module 441 is not limited to the position in FIG. 4. The encryption module 441 may be in an on state based on the control of the controller 440 to encrypt or decrypt plain data or encrypted data transmitted and received through the channel 450 between the buffer memory 431 and the buffer region 411 of NAND flash memory. Alternatively, the encryption module 441 may be in an off state based on the control of the controller 440 to provide encrypted data without decryption.

Specifically, for example, the encryption module 441 in an on state of the module may encrypt the plain data provided from the buffer memory 431. The encryption module 441 in an off state may not decrypt the encrypted data read from the buffer region 411 of NAND flash memory. Alternatively, for example, the encryption module 441 in an off state may not decrypt the encrypted data provided from the buffer memory 431. The encryption module 441 in an on state may decrypt the encrypted data read from the buffer region 411 of NAND flash memory.

In some embodiments, data provided from the buffer memory 431 and encrypted by the encryption module 441 based on the control of the N core 420 and/or the controller 440 may be programmed in the buffer region 411 of NAND flash memory. In addition, encrypted data provided from the buffer memory 431 may be programmed in the buffer region 411 of NAND flash memory.

In some embodiments, as described above, the buffer region 411 of NAND flash memory may be connected to the NAND flash memory 412, and data may be transmitted or received therebetween. However, when data is programmed in the buffer region 411 of NAND flash memory or data in the buffer region 411 of NAND flash memory is read through a DMA only mode as described below, the data in the buffer region 411 of NAND flash memory may be programmed or read without an access 413 to the NAND flash memory 412.

In some embodiments, when accessing memory (for example, the buffer memory 431, the buffer region 411 of NAND flash memory, or so on) through the channel 450, an interleaving manner may be used for the accessing. That is, the memory may be accessed in parallel by an interleaving manner in the channel 450 by being divided into a preset unit (for example, a bank). Because the existing data program/read/erase requests to the memory may be made in parallel for each preset unit (for example, a bank), at least one of an encryption request and a decryption request may be additionally made.

Figure 5:
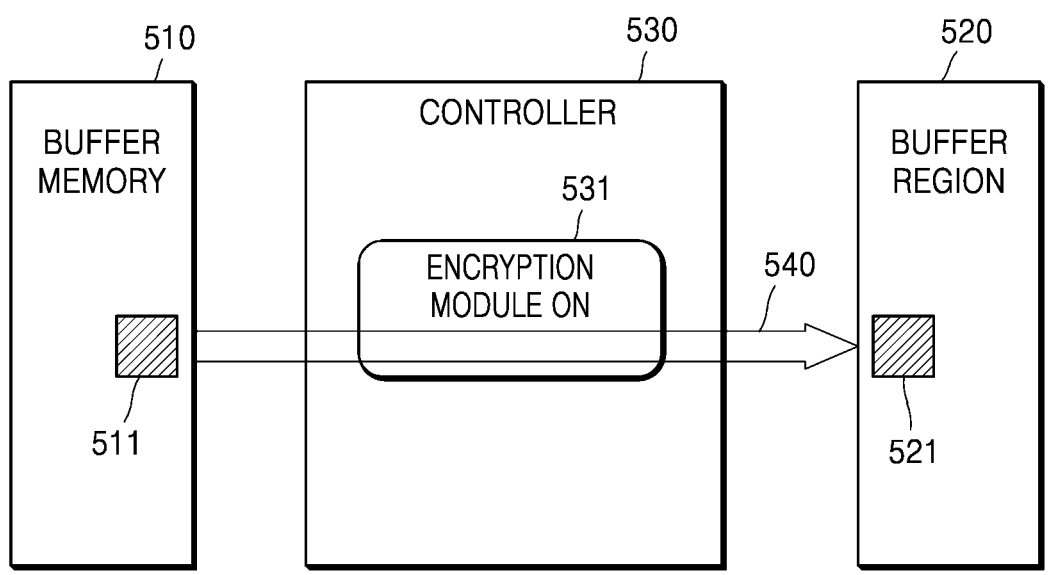
FIG. 5 is an example diagram illustrating a process of performing a program operation in a data encryption operation of the device of FIG. 4.

FIG. 5 is an example diagram illustrating a process of performing a program operation during a data encryption operation of the device of FIG. 4.

Referring to FIG. 5, a controller 530 may perform a program operation of a plain data encryption operation by using an encryption module 531 corresponding to (e.g., communicatively coupled to) the NAND flash memory device 410 of FIG. 4 according to a request (401 in FIG. 4) of a host (101 in FIG. 1) or as needed (for example, according to the need of firmware).

In some embodiments, the buffer memory 510 may provide the stored data to the buffer region 520 of NAND flash memory through a channel 540 based on the control of the controller 530. In some embodiments, when accessing data of the buffer memory 510, the controller 530 may access the buffer memory 510 in units of DMAs. Similarly, the controller 530 may also access the buffer region 520 of NAND flash memory in units of DMAs.

In some embodiments, data provided from the buffer memory 510 may include unencrypted plain data 511. In this case, the controller 530 may control the encryption module 531 to be in an on state. Accordingly, the plain data 511 provided from the buffer memory 510 may be encrypted by an encryption algorithm (for example, AES) of the encryption module 531. Data encrypted by the encryption module 531 may be provided to the buffer region 520 of NAND flash memory through the channel 540. Specifically, the controller 530 may receive a physical address of the buffer region 520 of NAND flash memory and may program the encrypted data in the memory 521 of the buffer region 520 of NAND flash memory based on the received physical address. As a result, the plain data 511 provided from the buffer memory 510 may be encrypted without the need to newly add a separate module.

Figure 6:
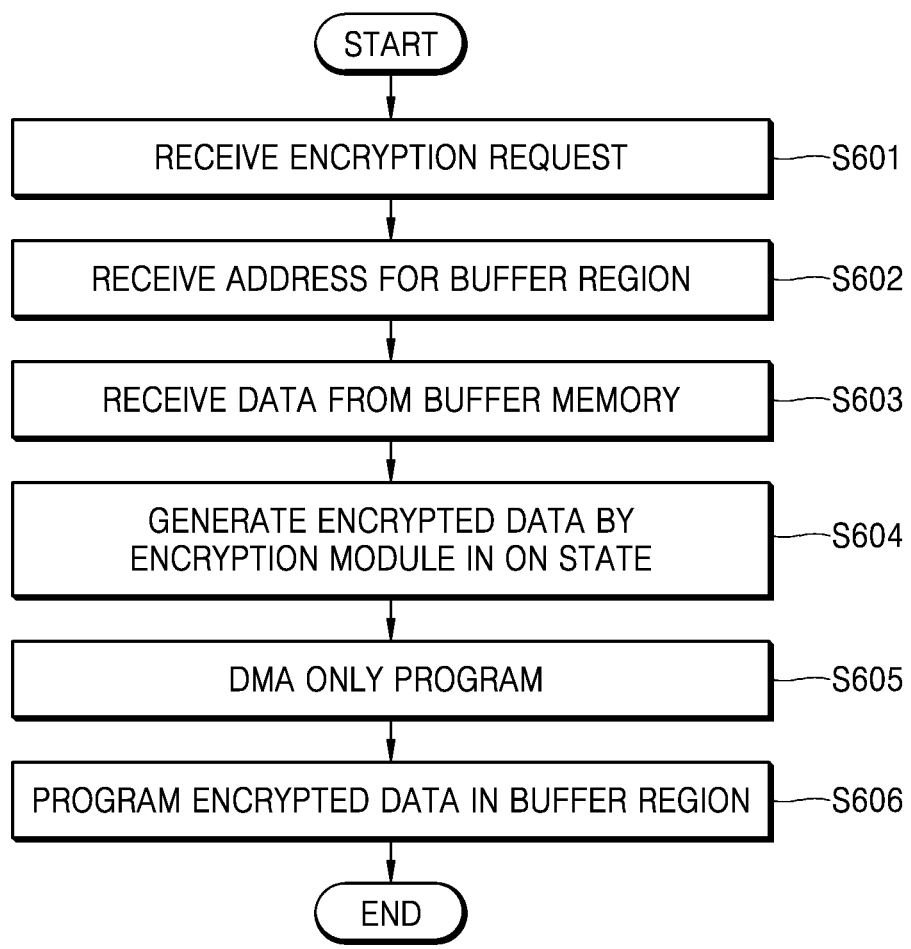
FIG. 6 is an example flowchart illustrating a process of performing the program operation in the data encryption operation of FIG. 5.

FIG. 6 is an example flowchart illustrating a process of performing a program operation during the data encryption operation of FIG. 5.

Referring to FIGS. 4 to 6, in some embodiments, when (e.g., while or after) an encryption request is received (S601), the controller 530 may receive an address to access the memory 521 in the buffer region 520 of NAND flash memory (S602). In some embodiments, the address may be, or may correspond to, a physical address that corresponds to (e.g., is obtained/received in response to) the encryption request. In addition, the controller 530 may receive the plain data 511 to be encrypted from the buffer memory 510 (S603). The controller 530 may generate encrypted data by causing the encryption module 531 to be in an on state based on an encryption request (S604). That is, the encryption module 531 may encrypt the plain data 511. The controller 530 may program the encrypted data in the memory 521 of the buffer region 520 of NAND flash memory based on the address received through the channel 540 (S606).

As a result, the plain data 511 provided from the buffer memory 510 may be encrypted and programmed in the buffer region 520 of NAND flash memory.

In some embodiments, during a process of programming the encrypted data in the buffer region 520 of NAND flash memory, the controller 530 may program the encrypted data in a DMA only program mode (S605). In this case, as described above, the data programmed in the buffer region 520 of NAND flash memory may be programmed in the buffer region 520 of NAND flash memory without the access 413 to a memory device (for example, the NAND flash memory 412). That is, when data is programed in a DMA only mode, only the encryption module 441 corresponding to the NAND flash memory device 410 is used without the access 413 to the NAND flash memory 412 of the NAND flash memory device 410, and thus, an effect of performing an encryption operation may be obtained without affecting the reliability of the NAND flash memory device 410. It is apparent that, when data is not programed in the DMA only program mode, operation S605 may be omitted.

Figure 7:
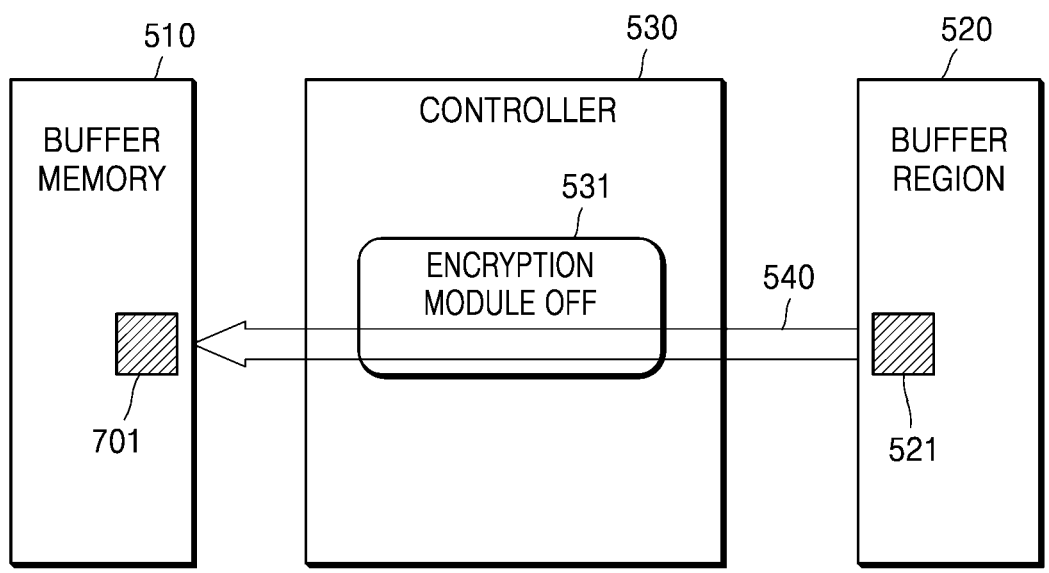
FIG. 7 is an example diagram illustrating a process of performing a read operation in the data encryption operation of the device of FIG. 4.

FIG. 7 is an example diagram illustrating a process of performing a read operation during a data encryption operation of the device of FIG. 4.

Referring to FIGS. 5 and 7, in some embodiments, the controller 530 may cause the encryption module 531 to be in an off state to store the encrypted data in an undecrypted (i.e., still encrypted) state in the buffer memory 510. The controller 530 may read the encrypted data stored in the memory 521 of the buffer region 520 of NAND flash memory through the channel 540. In this case, when the encryption module 531 is in an off state, the read encrypted data may be stored in the buffer memory 510 without being decrypted.

Figure 8:
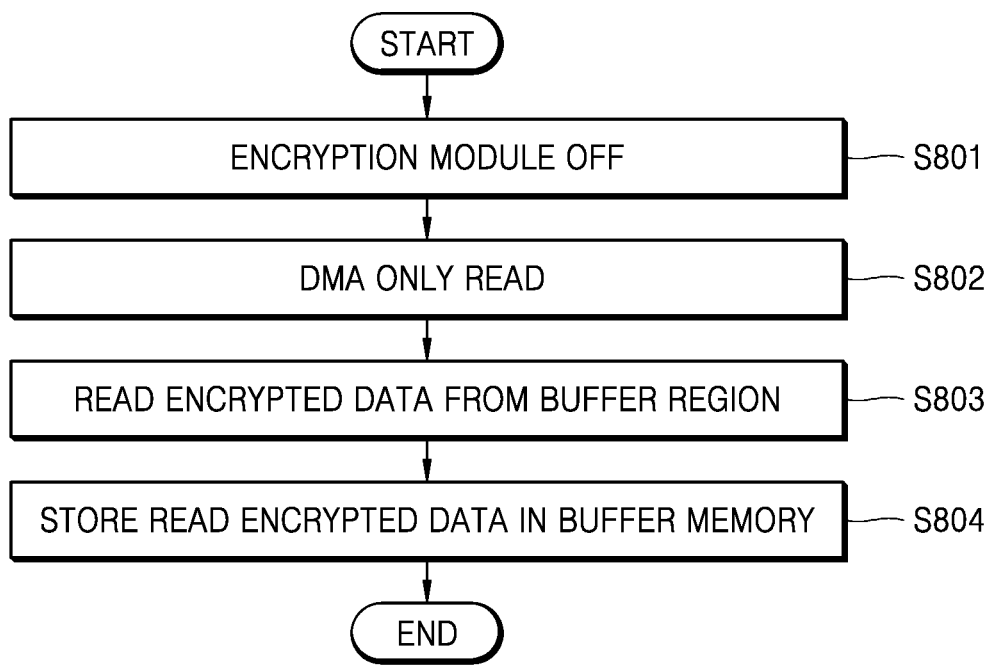
FIG. 8 is an example flowchart illustrating a process of performing the read operation in the data encryption operation of FIG. 7.

FIG. 8 is an example flowchart illustrating a process of performing a read operation during the data encryption operation of FIG. 7.

Referring to FIGS. 4, 5, 7, and 8, the controller 530 may cause the encryption module 531 in an off state (S801) to bring the encrypted data back to the buffer memory 510 without decryption. The controller 530 may read (S803) the encrypted data stored in the memory 521 in the buffer region 520 of NAND flash memory and transmit the read data to the buffer memory 510 (S804). As a result, the plain data 511 provided from the buffer memory 510 is encrypted without the need to newly add a separate module, and then the encrypted plain data 511 is stored in the buffer memory 510, and thus, encrypted data 701 may be obtained in the buffer memory 510.

In some embodiments, during a process of reading encrypted data from the memory 521 in the buffer region 520 of NAND flash memory, the controller 530 may read the encrypted data in a DMA only read mode (S802). In this case, as described above, when the encrypted data is read from the buffer region 520 of NAND flash memory, the encrypted data may be read without the access 413 to a memory device (for example, the NAND flash memory 412). That is, when data is read in a DMA only mode, only the encryption module 441 corresponding to the NAND flash memory device 410 may be used without the access 413 to the NAND flash memory 412 of the NAND flash memory device 410, and thus, an effect of reading encrypted data may be obtained without affecting the reliability of the NAND flash memory device 410. It is apparent that, when data is not read in the DMA only read mode, operation S802 may be omitted.

Figure 9:
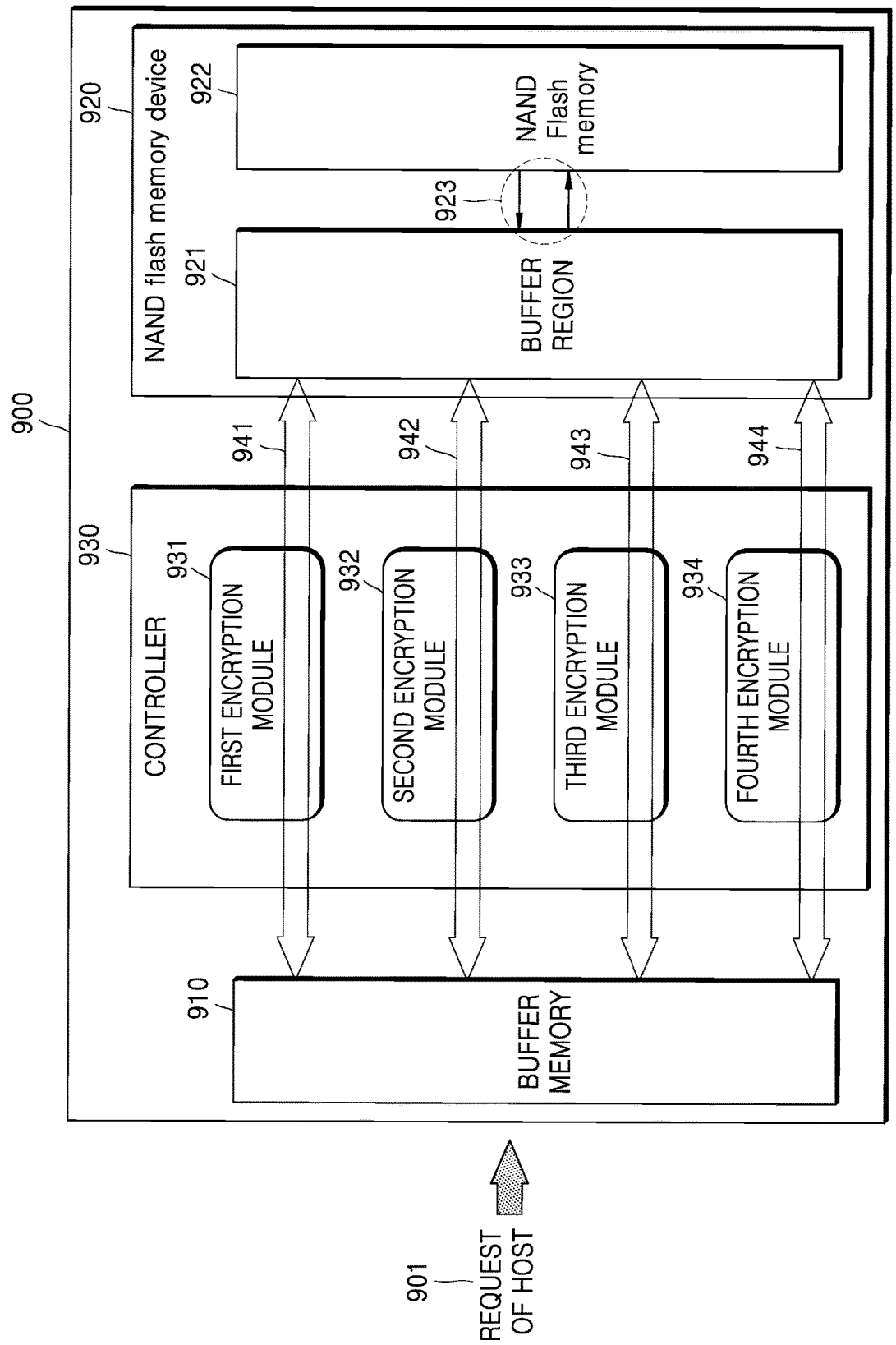
FIG. 9 is a diagram specifically illustrating a structure of a data storage device including a plurality of channels, according to another example embodiment of the invention.

FIG. 9 is a diagram specifically illustrating a structure of a data storage device including a plurality of channels, according to another example embodiment of the invention.

Referring to FIGS. 4 to 9, a data storage device 900 may include a memory device 920 (hereinafter, referred to as a NAND flash memory device as described above for the sake of convenience of description), a buffer memory 910, a controller 930, and first to fourth channels 941, 942, 943, and 944. The controller 930 may include first to fourth encryption modules 931, 932, 933, and 934 corresponding to (e.g., communicatively coupled to) the NAND flash memory device 920. The NAND flash memory device 920 may include a buffer region 921 and a NAND flash memory 922. Descriptions of an N core and an F core that perform various functions are the same as the descriptions made with reference to FIG. 4, and thus descriptions thereof are omitted with respect to FIG. 9. In addition, structures and functions of the illustrated components are the same as described with reference to FIG. 4, and thus descriptions thereof are omitted with respect to FIG. 9.

In some embodiments, the number of channels and the number of encryption modules may be two or more. In this case, the first to fourth channels 941, 942, 943, and 944 may respectively correspond to (e.g., be communicatively coupled to) first to fourth encryption modules 931, 932, 933, and 934. For example, the first to fourth encryption modules 931, 932, 933, and 934 may be coupled (e.g., communicatively coupled) to the buffer region 921 by the first to fourth channels 941, 942, 943, and 944, respectively. In addition, the controller 930 may control each of the first to fourth channels 941, 942, 943, and 944 and each of the first to fourth encryption modules 931, 932, 933, and 934 to operate according to a request.

In some embodiments, each of the first to fourth channels 941, 942, 943, and 944 may access the buffer memory 910 and/or the buffer region 921 of NAND flash memory in an interleaving manner. For example, the buffer memory 910 is divided into DMA units, and encryption and/or decryption of data may be requested in an interleaving manner for each of the first to fourth channels 941, 942, 943, and 944. Similarly, access to the buffer region 921 of NAND flash memory may also be performed in units of DMAs for each of the first to fourth channels 941, 942, 943, and 944. Because a program request, a read request, and an erase request are made in parallel for each of the first to fourth channels 941, 942, 943, and 944 in general, encryption and/or decryption of data may be additionally requested.

In some embodiments, an operation of each of the first to fourth channels 941, 942, 943, and 944 may be performed in an asynchronous manner by respectively accessing the first to fourth channels 941, 942, 943, and 944 in an interleaving manner in units of DMAs. That is, the host 101, firmware, or so on may request an encryption operation or a decryption operation for one or more channels and then make a different request from the above request to another channel through scheduling to perform the operation.

For example, according to a plurality of requests 901 from a host, even when encryption or decryption of data is being performed in one or more channels, encryption or decryption of other data may be performed asynchronously on other channels. Alternatively, even when an encryption or decryption operation is being performed in one or more channels, a memory operation (for example, a data write operation, a data read operation, a data erase operation, and so on of the NAND flash memory 922) other than encryption or decryption may be performed asynchronously in another channel.

Specifically, in some embodiments, the controller 930 may receive a plurality of requests 901 from a host. The plurality of requests 901 from the host may include an encryption request and/or a decryption request. Hereinafter, a case in which the requests 901 from the host are encryption requests is described as an example, but it is apparent that the following description may be applied in the same manner by applying a method of performing a decryption operation to be described below even when the plurality of requests 901 from the host are an encryption request and/or a decryption request.

For example, when the controller 930 receives two encryption requests from a host or so on, the controller 930 may receive unencrypted first and second plain data by respectively accessing the first channel 941 and the second channel 942 in a state in which a valid data buffer of the buffer memory 910 is divided into DMA units. In this case, the first channel 941 and the second channel 942 may access the buffer memory 910 in an interleaving manner. That is, for example, until an access of the first channel 941 to the buffer memory 910 is completed, each channel is accessed without limiting access of another channel (for example, the second channel 942) in a state in which memory regions of the buffer memory 910 are divided into DMA-capable units, and thus, respective channels may perform operations in parallel through access to different memory regions of the buffer memory 910. Accordingly, the first channel 941 and the second channel 942 may respectively receive the first plain data and the second plain data in parallel. Similarly, the first channel 941 and the second channel 942 may access the buffer region 921 of NAND flash memory in parallel in units of DMAs.

In addition, the controller 930 may receive addresses for accessing the buffer region 921 of NAND flash memory through the first and second channels 941 and 942. The controller 930 may cause the first encryption module 931 and the second encryption module 932, which respectively correspond to the first channel 941 and the second channel 942, to be in an on state to perform/fulfill the received encryption requests. Accordingly, the first encryption module 931 and the second encryption module 932 may respectively encrypt the first plain data and the second plain data. In the same manner as described above, the first encryption module 931 and the second encryption module 932 may perform encryption in parallel. The controller 930 may program in parallel the encrypted first data and the encrypted second data in a memory region based on the received addresses of the buffer region 921 of NAND flash memory through the first channel 941 and the second channel 942.

In some embodiments, during a process of programming the encrypted data in the buffer region 921 of NAND flash memory, the controller 930 may program the data encrypted in a DMA only program mode through at least one of the first channel 941 and the second channel 942. That is, a program operation may be performed without access 923 to the NAND flash memory 922. Specific processes and effects thereof may be the same as/analogous to those described above, and repeated descriptions thereof may thus be omitted.

In some embodiments, for example, the controller 930 may receive two encryption requests from a host or so on. In this case, the controller 930 may perform encryption requests through the first channel 941 and the second channel 942 as described above. In this case, the third channel 943 and the fourth channel 944 excluding the first channel 941 and the second channel 942 may perform an operation other than the encryption operation. When the third channel 943 and the fourth channel 943 need to access the buffer memory 910 in performing an operation other than the encryption operation, the access may be performed in an interleaving manner in a state in which each channel is divided into DMA units. That is, as described above, the first to fourth channels 941, 942, 943, and 944 may perform operations in parallel through access to different memory regions in the buffer memory 910 and/or the buffer region 921 of NAND flash memory. As a result, even when the first channel 941 and the second channel 942 are respectively performing encryption operations, the third channel 943 and the fourth channel 944 may perform operations other than the encryption operation in parallel.

A plurality of channels and a plurality of encryption modules are illustrated as four by way of example in FIG. 9 but are not limited thereto. The number of channels and encryption modules may be greater than four, and the number of encryption requests may be greater than two.

Figure 10:
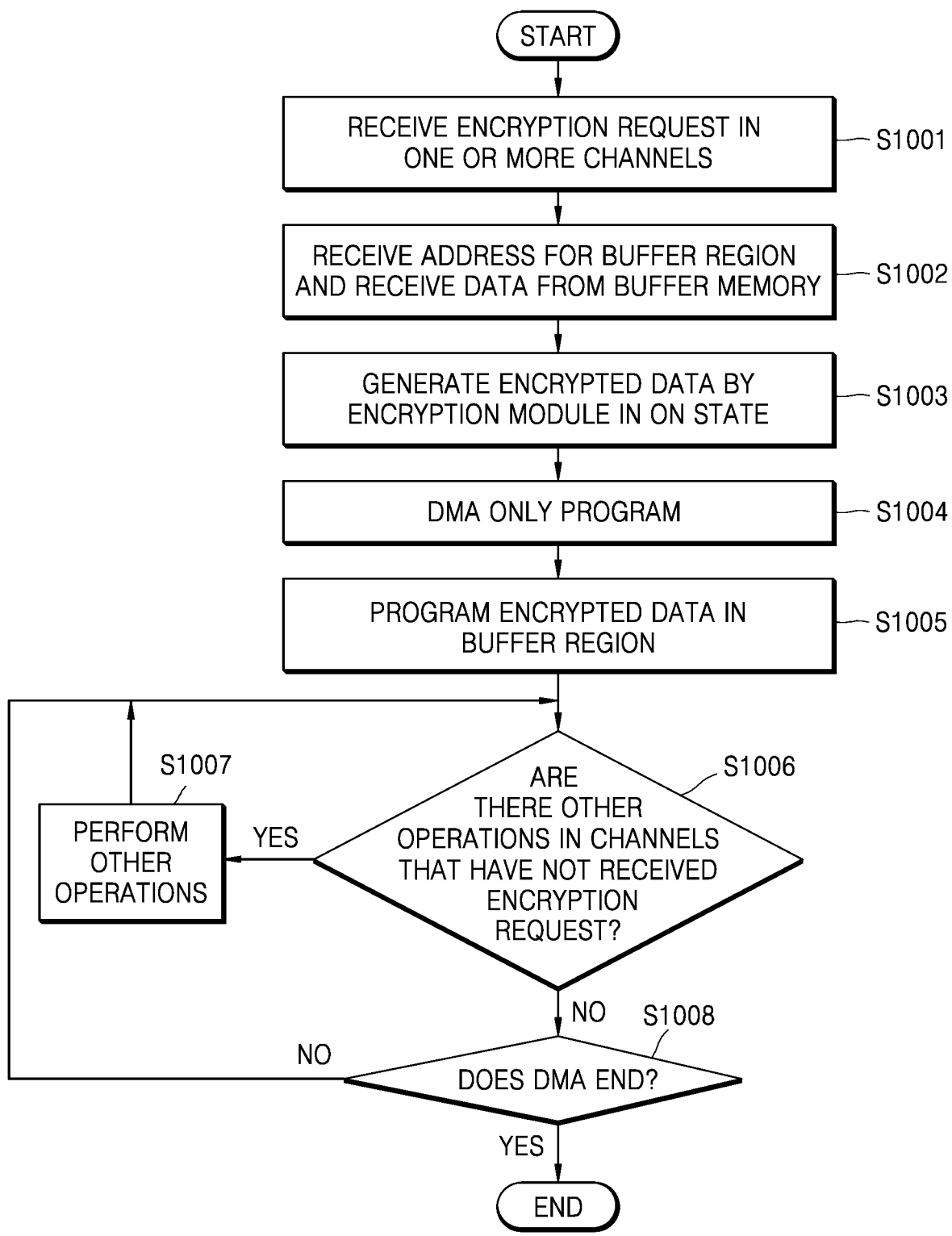
FIG. 10 is an example flowchart illustrating a process of performing a program operation in a data encryption operation of the data storage device of FIG. 9.

FIG. 10 is an example flowchart illustrating a process of performing a program operation during the data encryption operation of the device of FIG. 9.

Referring to FIGS. 6, 9, and 10, operations S1001 to S1005 of performing a program operation of an encryption operation in one or more of the plurality of channels, which are illustrated in FIG. 10, may be similar to operations S601 to S606 of performing a program operation of an encryption operation in a single channel, which are illustrated in FIG. 6, and thus, repeated descriptions thereof are omitted. For example, operations S1001, S1003, S1004, and S1005 may be analogous to operations S601, S604, S605, and S606 respectively, and operation S1002 may be analogous to operations S602 and S603.

In some embodiments, as described above, even when a program operation of an encryption operation is being performed (S1002 to S1005) in one or more channels (S1001) that received an encryption request, different encryption operations or operations other than the encryption operations may be performed on the other channels. Specifically, because an operation is performed in each channel in an interleaving manner in units of DMAs as described above, whether operations of the respective channels are completed may be different for different channels. Therefore, even when operation S1005 of programming the encrypted data in a buffer region of NAND flash memory in one or more channels is completed, whether operations on the other channels are completed may be determined (S1006). For example, even when operation S1005 is completed in one or more channels, operations on the other channels may be performed as it is (S1007) when the operations on the other channels are not completed. For example, when the operations on the other channels are completed, whether all DMA-based accesses to all channels are completed may be determined (S1008). When the DMA-based accesses to all channels are not completed, all operations may be performed by repeatedly performing operations S1006 to S1008. When the DMA-based accesses to all channels are completed, it can be determined that operations of all channels including the channel in which a program operation of an encryption operation is performed are completed. As a result, a program operation of an encryption operation or other operations may be performed in parallel on each of a plurality of channels.

Figure 11:
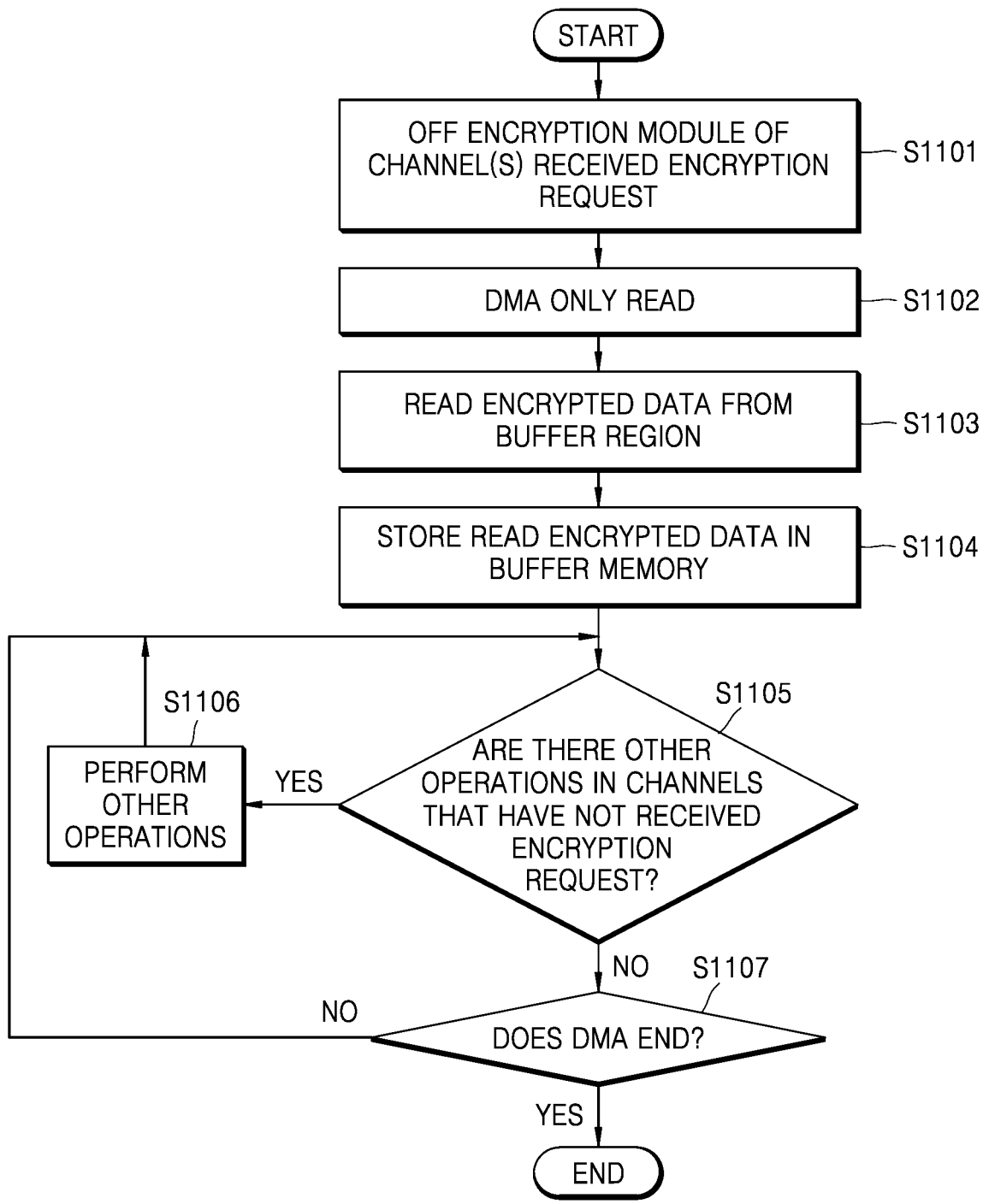
FIG. 11 is an example flowchart illustrating a process of performing a read operation in the data encryption operation of the data storage device of FIG. 9.

FIG. 11 is an example flowchart illustrating a process of performing a read operation during the data encryption operation of the device of FIG. 9.

Referring to FIGS. 8, 9, and 11, operations S1101 to S1104 of performing a read operation of an encryption operation in one or more of the plurality of channels, which are illustrated in FIG. 11, may be similar to operations S801 to S804, respectively, of performing a read operation of an encryption operation in a single channel, which are illustrated in FIG. 8, and thus, repeated descriptions thereof are omitted.

In some embodiments, as described above, even when a read operation of an encryption operation is being performed (S1002 to S1005) in one or more channels (S1001) that received an encryption request, different encryption operations or operations other than the encryption operations may be performed on the other channels. Specifically, because an operation is performed in each channel in an interleaving manner in units of DMAs as described above, whether operations of the respective channels are completed may be different for different channels. Therefore, even when operations S1104 of storing the encrypted data read from one or more channels in the buffer memory are completed, whether operations on the other channels are completed may be determined (S1105). For example, even when operation S1104 is completed in one or more channels, operations in the other channels may be performed as it is (S1106) when the operations on the other channels are not completed. For example, when the operations on the other channels are completed, whether all DMA-based accesses to all channels are completed may be determined (S1007). When the DMA-based accesses to all channels are not completed, all operations may be performed by repeatedly performing operations S1005 to S1007. When the DMA-based accesses to all channels are completed, it can be determined that operations of all channels including the channel in which a read operation of an encryption operation is performed are completed. As a result, a read operation of an encryption operation or other operations may be performed in parallel on each of a plurality of channels.

Figure 12:
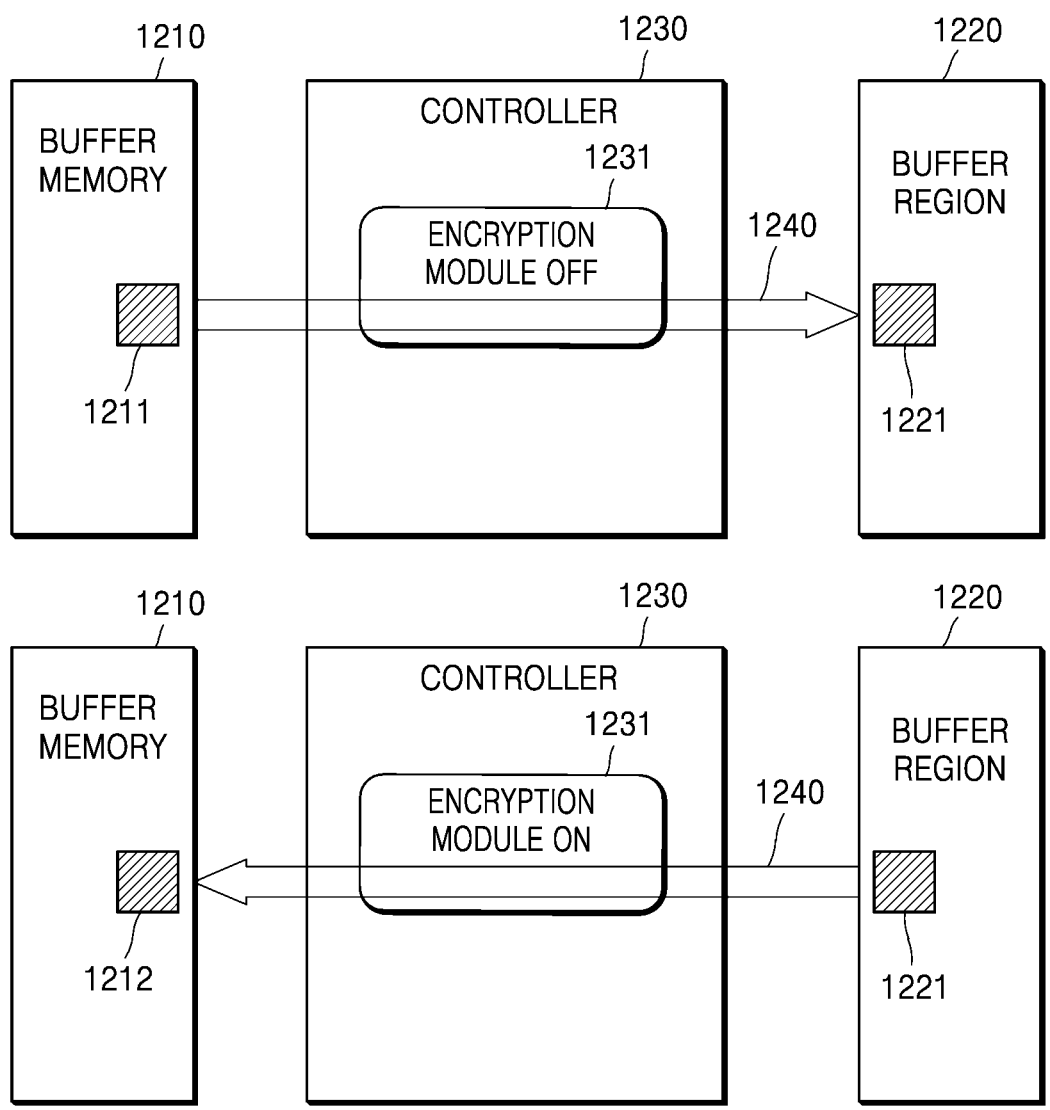
FIG. 12 is an example diagram illustrating a process of performing a decryption operation of encrypted data of the device of FIG. 4.

FIG. 12 is an example diagram illustrating a process of performing a decryption operation of encrypted data of the device of FIG. 4.

Referring to FIG. 12, a controller 1230 may perform a decryption operation of encrypted data by using an encryption module 1231 corresponding to (e.g., communicatively coupled to) the NAND flash memory device 920 in FIG. 9 according to the request 901 in FIG. 9 of the host 101 or as needed (for example, according to the need of firmware).

In some embodiments, a buffer memory 1210 may provide the stored data to a buffer region 1220 of NAND flash memory through a channel 1240, based on the control of the controller 1230. In some embodiments, when accessing data of the buffer memory 1210, the controller 1230 may access the buffer memory 1210 in units of DMAs. Similarly, the controller 1220 may also access the buffer region 520 of NAND flash memory in units of DMAs.

In some embodiments, data provided from the buffer memory 1210 may include encrypted data 1211. In this case, the controller 1230 may control the encryption module 1231 to be in an off state. Accordingly, the encrypted data 1211 provided from the buffer memory 1210 may be provided in an undecrypted (e.g., still encrypted) state. The encrypted data 1211 may be provided to the buffer region 1220 of NAND flash memory through the channel 1240. Specifically, the controller 1230 may receive an address of the buffer region 1220 of NAND flash memory and program the encrypted data 1211 in memory 1221 in the buffer region 1220 of NAND flash memory based on the received address.

The controller 1230 may control the encryption module 1231 to be in an on state in order to decrypt the encrypted data programmed in the memory 1221 in the buffer region 1220 of NAND flash memory. The controller 1230 may read the encrypted data stored in the memory 1221 in the buffer region 1220 of NAND flash memory through the channel 1240. Accordingly, because the encryption module 1231 is in an on state, the encrypted data read from the memory 1221 in the buffer region 1220 of NAND flash memory may be decrypted by using an encryption algorithm (for example, an AES standard) of the encryption module 1231. The controller 1230 may provide the data decrypted by the encryption module 1231 to the buffer memory 1210 through the channel 1240 as decrypted data 1212.

Figure 13:
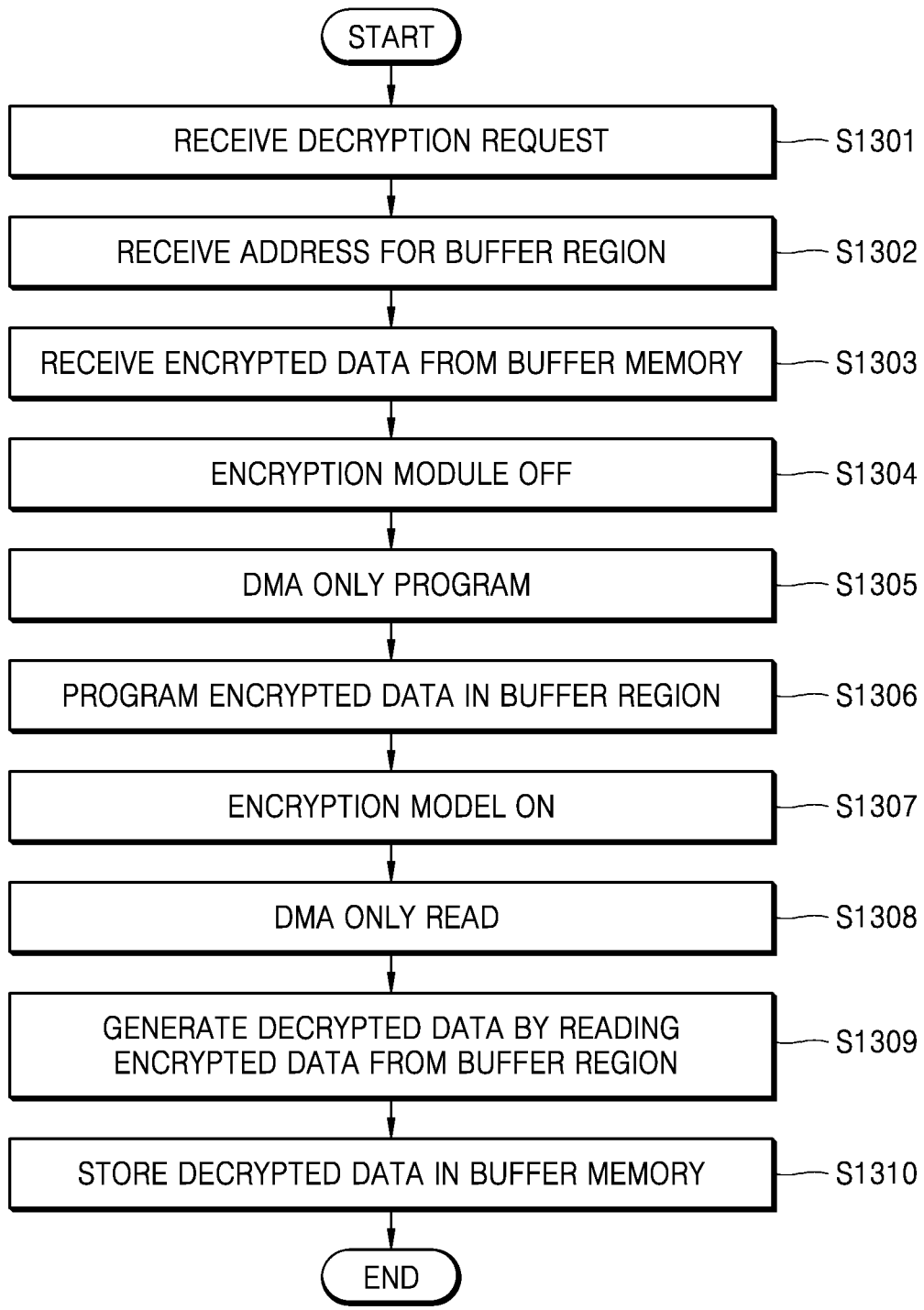
FIG. 13 is an example flowchart illustrating a process of performing the decryption operation of the encrypted data of FIG. 12.

FIG. 13 is an example flowchart illustrating a process of performing a decryption operation of the encrypted data of FIG. 12.

Referring to FIGS. 4, 12, and 13, in some embodiments, when a decryption request is received (S1301), the controller 1230 may receive an address to access the memory 1221 in the buffer region 1220 of NAND flash memory (S1302). In addition, the controller 1230 may receive the encrypted data 1211 to be decrypted from the buffer memory 1210 (S1303). The controller 1230 may cause the encryption module 1231 to be in an off state based on a decryption request (S1304). Accordingly, the encryption module 1231 may provide the encrypted data 1211 in an undecrypted (e.g., still encrypted) state. The controller 1230 may program the encrypted data in the memory 1221 in the buffer region 1220 of a NAND flash memory, based on the address received through the channel 1240 (S1306).

In some embodiments, during a process of programming the encrypted data 1211 in the buffer region 1220 of NAND flash memory or reading the encrypted data in the buffer region 1220 of NAND flash memory as described below, the controller 1230 may program (S1305) or read (S1308) the encrypted data in a DMA only program/read mode. In this case, as described above, the encrypted data programmed in the buffer region 1220 of NAND flash memory or the encrypted data read from the buffer region 1220 of NAND flash memory may be programmed or read without access 413 to a memory device (for example, the NAND flash memory 412). That is, when data is programmed or read in a DMA only mode, only the encryption module 441 corresponding to the NAND flash memory device 410 is used without the access 413 to the NAND flash memory 412 of the NAND flash memory device 410, and thus, an effect of performing an encryption operation may be obtained without affecting the reliability of the NAND flash memory device 410. It is apparent that, when data is not programmed and/or read in a DMA only program and/or read mode, operation S1305 and/or operation S1308 may be omitted.

The controller 1230 may cause the encryption module 1231 to be in an on state (S1307) to decrypt encrypted data programmed in the memory 1221 in the buffer region 1220 of NAND flash memory. The controller 1230 may read the encrypted data programmed in the memory 1221 in the buffer region 1220 of NAND flash memory and generate decrypted data (S1309). That is, the encryption module 1231 may decrypt the encrypted data. The controller 1230 may store the decrypted data in the buffer memory 1210 (S1310). As a result, the decrypted data 1212 may be obtained by decrypting the encrypted data 1211 provided from the buffer memory 1210 without adding a new separate module and then storing the decrypted data in the buffer memory 1210 again (e.g., storing the data in the buffer memory 1210 again but as decrypted data).

Figure 14:
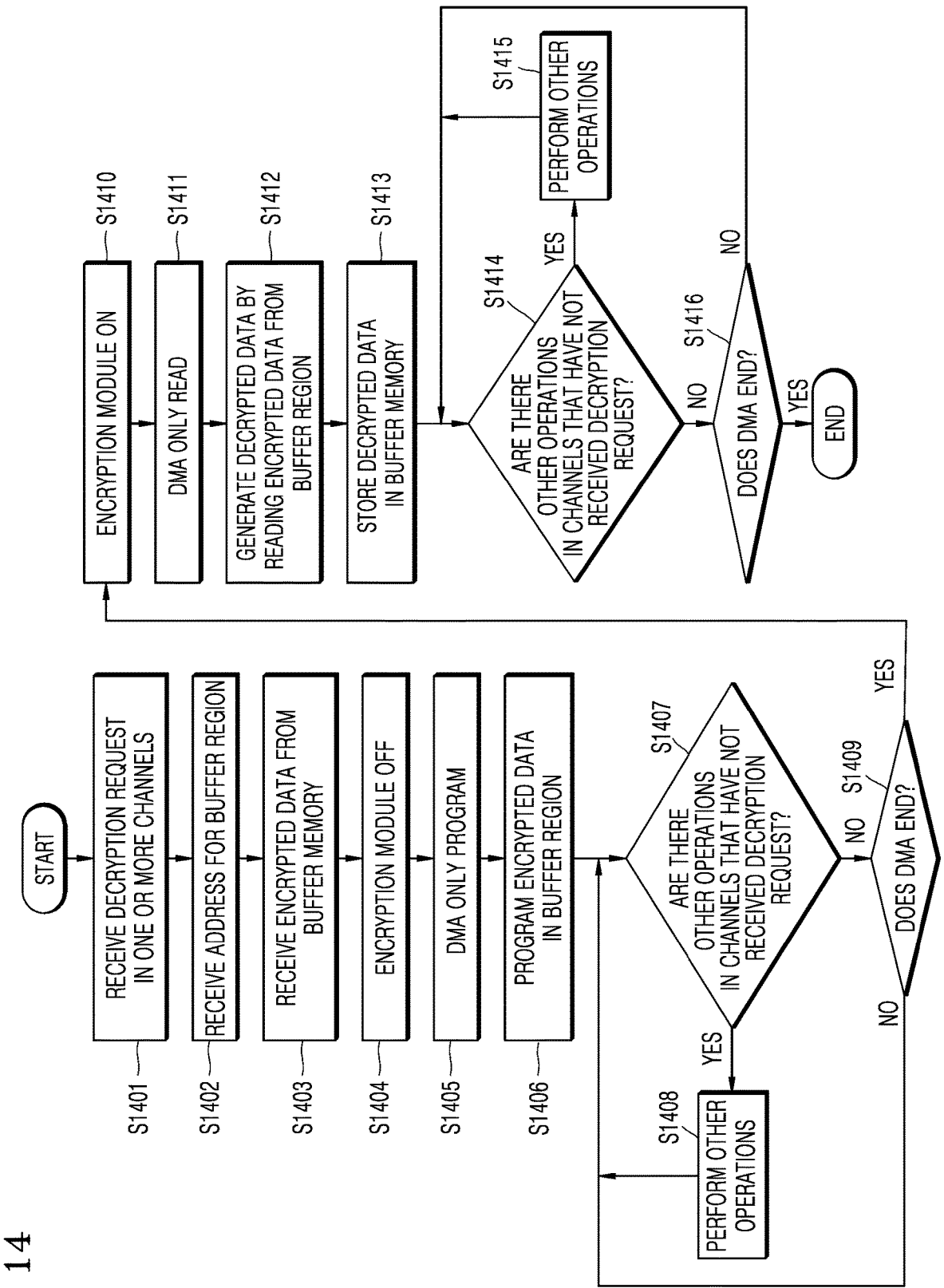
FIG. 14 is an example flowchart illustrating a process of performing a decryption operation of encrypted data of the device of FIG. 9.

FIG. 14 is an example flowchart illustrating a process of performing a decryption operation of encrypted data of the device of FIG. 9.

Referring to FIGS. 9, 13, and 14, operations S1401 to S1406 and S1410 to S1413 of performing a decryption operation in one or more of the plurality of channels, which are illustrated in FIG. 9 may be similar to the operations S1301 to S1310 of performing the decryption operation in a single channel, which are illustrated in FIG. 13, and thus, repeated descriptions thereof are omitted.

In some embodiments, as described above, even when a program operation of a decryption operation is being performed (S1401 to S1406) in one or more channels (S1401) that received a decryption request, different decryption operations or operations other than the decryption operations may be performed on the other channels. Specifically, because an operation is performed in each channel in an interleaving manner in units of DMAs as described above, whether operations of the respective channels are completed may be different for different channels. Therefore, even when the process S1406 of programming encrypted data in a buffer region of NAND flash memory in one or more channels is completed, whether operations on the other channels are completed may be determined (S1407). For example, even when operation S1406 is completed in one or more channels, operations in the other channels may be performed as it is (S1408) when the operations on the other channels are not completed. For example, when the operations on the other channels are completed, whether all DMA-based accesses to all channels are completed may be determined (S1409). When the DMA-based accesses to all channels are not completed, all operations may be performed by repeatedly performing operations S1407 to S1409. When the DMA-based accesses to all channels are completed, it can be determined that operations of all channels including the channel in which a program operation of a decryption operation is performed are completed. As a result, a program operation of a decryption operation or other operations may be performed in parallel on each of a plurality of channels.

In some embodiments, as described above, even when a read operation of a decryption operation is being performed (S1401 to S1413) in one or more channels (S1401) that received a decryption request, different decryption operations or operations other than the decryption operations may be performed on the other channels. Specifically, because an operation is performed in each channel in an interleaving manner in units of DMAs as described above, whether operations of the respective channels are completed may be different for different channels. Therefore, even when the process S1413 of storing the data decrypted in one or more channels in the buffer memory is completed, whether operations on the other channels are completed may be determined (S1414). For example, even when the process S1413 is completed in one or more channels, operations in the other channels may be performed as it is (S1415) when the operations on the other channels are not completed. For example, when the operations on the other channels are completed, whether all DMA-based accesses to all channels are completed may be determined (S1416). When the DMA-based access to the channels is not completed, operations S1414 to S1416 may be repeatedly performed. When the DMA-based accesses to channels are completed, it can be determined that operations of all channels including the channel in which a read operation of a decryption operation is performed are completed. As a result, a read operation of a decryption operation or other operations may be performed in parallel on each of a plurality of channels.

Figure 15:
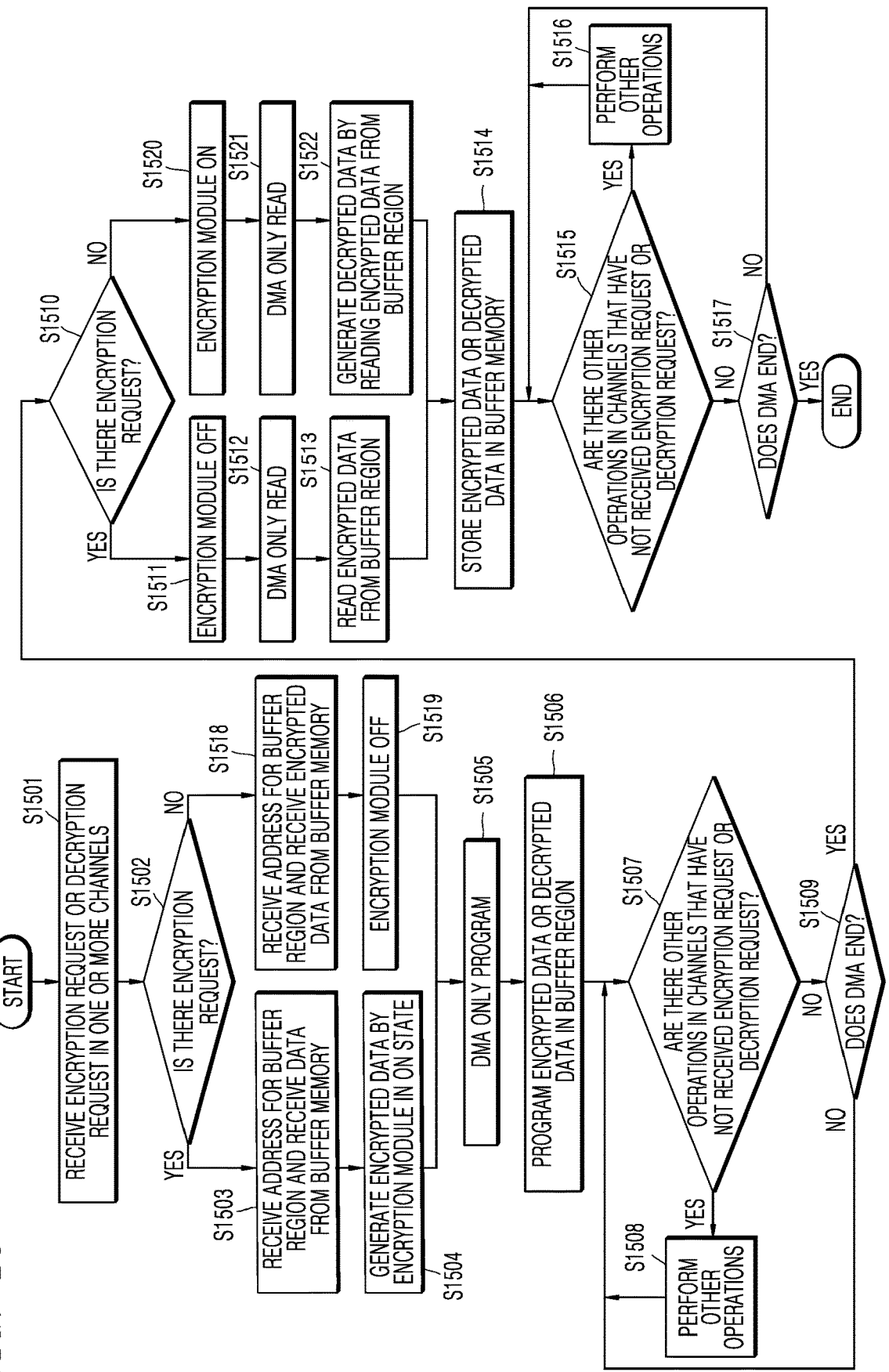
FIG. 15 is an example flowchart illustrating a process of performing an encryption operation and a decryption operation by a data storage device including a plurality of channels, according to an example embodiment of the invention.

FIG. 15 is an example flowchart illustrating a process of performing an encryption operation and a decryption operation by using a data storage device including a plurality of channels, according to an example embodiment of the invention.

Referring to FIG. 1 and FIGS. 9 to 15, operations S1501 and S1503 to S1506 of performing a program operation of an encryption operation in one or more of a plurality of channels of the data storage device 900, operations S1511 to S1514 of performing a read operation of the encryption operation therein, and process S1501, S1518, S1519, S1505, S1506, S1520 to S1522, and S1514 of performing a decryption operation therein are the same as/analogous to processes described above in detail, and thus, repeated detailed descriptions thereof are omitted. In addition, operations S1507 to S1509 and S1515 to S1517 of performing an encryption operation and/or a decryption operation in a plurality of channels in parallel, or processes of performing an encryption operation and/or a decryption operation and operations other than the encryption and decryption operations in the plurality of channels in parallel are also the same as/analogous to processes described above in detail, and thus, repeated detailed descriptions thereof are omitted.

In some embodiments, when receiving a plurality of encryption requests and/or decryption requests from a host or so on (S1501), a controller may determine whether a corresponding request is an encryption request or a decryption request as described above (S1502).

Hereinafter, a case in which one of a plurality of requests received from a host or so on is an encryption request will be described as an example, but it is apparent that the following description may be applied in the same manner by applying a method of performing the encryption operation and/or the decryption operation described above even when a plurality of requests received from a host or so on are a plurality of encryption and/or decryption requests.

For example, the data storage device 900 may perform a first operation in units of DMA in all channels through the controller 930. When the received request is an encryption request, the controller 930 may perform a program operation of an encryption operation through the first channel 941 (S1503 to S1506). Even while the program operation of the encryption operation is being performed through the first channel 941, other operations (for example, another encryption operation, a decryption operation, or a memory operation other than the encryption operation and the decryption operation) may be performed in parallel in the other channels. The controller 930 may determine whether the first operation in all channels in units of DMAs is completed (S1509). When the first operation in all channels in units of DMAs is completed, it can be determined that operations of all channels including the first channel 941 are completed. In this case, the controller 930 may perform a second operation in all channels in units of DMAs. The controller may perform a read operation of the encryption operation through the first channel 941 (S1511 to S1514). Similarly, even when the read operation of the encryption operation is being performed through the first channel 941, other operations (for example, another encryption operation, another decryption operation, or a memory operation other than the encryption operation and the decryption operation) may be performed in other channels in parallel. The controller 930 may determine whether the second operation in all channels in units of DMAs is completed (S1517). When the second operation in all channels in units of DMAs is completed, it can be determined that operations in all channels including the first channel 941 are completed.

As a result, even when the data storage device 900 receives a plurality of requests 901 including a plurality of encryption requests and/or a plurality of decryption requests from a host or so on, the data storage device 900 may perform the plurality of requests 901 in parallel by using a plurality of channels through the controller 930.

While the invention has been particularly shown and described with reference to example embodiments thereof, it will be understood that various changes in form and details may be made thereto without departing from the scope of the invention as defined by the appended claims.

What is claimed is:

1. An operating method of a solid state drive (SSD) including a buffer memory, a non-volatile memory, and a controller, the operating method comprising:
   receiving, from a host, an encryption request for data stored in the buffer memory; and
   performing an encryption operation within the controller in response to the encryption request,
   wherein the performing of the encryption operation comprises performing a program operation,
   wherein the performing of the program operation comprises:
      receiving a physical address of a buffer region of the non-volatile memory;
      receiving, by the controller, the data from the buffer memory;
      generating encrypted data by causing an encryption module included in the controller to be in an on state to encrypt the data stored in the buffer memory; and
      programming the encrypted data in the buffer region of the non-volatile memory based on the physical address,
   wherein the controller includes the encryption module, is located between the buffer memory and the non-volatile memory, controls a channel connecting the buffer memory and the buffer region of the non-volatile memory, and performs the encryption operation through interaction between the encryption module and the channel during data transmission between the buffer memory and the buffer region of the non-volatile memory,
   wherein the non-volatile memory comprises the buffer region and a non-volatile memory array, and
   wherein the buffer region is separate from the buffer memory.

2. The operating method of claim 1, wherein the buffer region of the non-volatile memory includes a page buffer included in the non-volatile memory, and
   wherein the programming of the encrypted data in the buffer region of the non-volatile memory is performed without accessing the non-volatile memory array.

3. The operating method of claim 1, wherein the programming of the encrypted data in the buffer region comprises programming the encrypted data in a direct memory access (DMA) only program mode,
   wherein the encryption module is coupled between the buffer memory and the buffer region,
   wherein the buffer memory is communicatively coupled to the buffer region through the channel, and
   wherein the buffer memory comprises dynamic random-access memory (DRAM).

4. The operating method of claim 1,
   wherein the performing of the encryption operation in response to the encryption request further comprises performing a read operation,
   wherein the performing of the read operation comprises causing the encryption module to be in an off state, reading the encrypted data from the buffer region of the non-volatile memory, and storing the read encrypted data in the buffer memory, and
   wherein the reading of the encrypted data from the buffer region of the non-volatile memory is performed without accessing the non-volatile memory array.

5. The operating method of claim 4,
   wherein the buffer region includes a page buffer included in the non-volatile memory, and
   wherein the performing of the read operation comprises reading the encrypted data in a direct memory access (DMA) only read mode.

6. The operating method of claim 4,
   wherein the encryption module is a first encryption module of a plurality of encryption modules that are included in the controller,
   wherein the channel is a first channel of a plurality of channels, and
   wherein the plurality of encryption modules are coupled to the buffer region of the non-volatile memory by the plurality of channels, respectively.

7. The operating method of claim 6,
   wherein the plurality of channels include the first channel and a second channel,
   wherein the plurality of encryption modules include the first encryption module and a second encryption module,
   wherein the receiving of the encryption request comprises receiving, from the host, a first encryption request and a second encryption request for first data and second data, respectively, stored in the buffer memory,
   wherein the performing of the encryption operation comprises:
      performing first encrypting including performing the program operation and performing the read operation by using the first encryption module and the first channel based on a first physical address that corresponds to the first encryption request; and
      performing second encrypting including performing the program operation and performing the read operation by using the second encryption module and the second channel based on a second physical address that corresponds to the second encryption request, and wherein the first encrypting and the second encrypting are performed in parallel with each other.

8. The operating method of claim 6,
wherein the plurality of channels include the first channel and a second channel,
wherein the first encryption module is coupled to the buffer region of the non-volatile memory by the first channel,
wherein the operating method further comprises performing a memory operation including at least one of a data write operation, a data read operation, or an erase operation for the non-volatile memory by using the second channel,
wherein the performing of the encryption operation comprises performing the program operation and performing the read operation by using the first channel, and
wherein the performing of the encryption operation and the performing of the memory operation are performed in parallel with each other.

9. An operating method of a data storage device including a buffer memory, a non-volatile memory, and a controller, the operating method comprising:
receiving, from a host, a decryption request for encrypted data stored in the buffer memory; and
performing a decryption operation within the controller in response to the decryption request,
wherein the performing of the decryption operation comprises:
    receiving a physical address of a buffer region of the non-volatile memory, wherein the buffer region of the non-volatile memory is separate from the buffer memory;
    receiving, by the controller, the encrypted data from the buffer memory;
    causing an encryption module included in the controller to be in an off state;
    programming the encrypted data in the buffer region of the non-volatile memory based on the physical address;
    reading the encrypted data from the buffer region of the non-volatile memory and generating decrypted data by causing the encryption module included in the controller to be in an on state to decrypt the encrypted data read from the buffer region of the non-volatile memory; and
    storing the decrypted data in the buffer memory, and
wherein the controller includes the encryption module, is located between the buffer memory and the non-volatile memory, controls a channel connecting the buffer memory and the buffer region of the non-volatile memory, and performs the decryption operation through interaction between the encryption module and the channel during data transmission between the buffer memory and the buffer region of the non-volatile memory.

10. The operating method of claim 9,
wherein, prior to receiving the decryption request from the host, the encrypted data is stored in the buffer memory,
wherein the buffer region includes a page buffer included in the non-volatile memory, and
wherein the programming of the encrypted data in the buffer region comprises programming the encrypted data in a direct memory access (DMA) only program mode.

11. The operating method of claim 9,
wherein the buffer region includes a page buffer included in the non-volatile memory, and
wherein the reading of the encrypted data from the buffer region comprises reading the encrypted data in a direct memory access (DMA) only read mode.

12. The operating method of claim 9,
wherein the encryption module is a first encryption module of a plurality of encryption modules that are included in the controller,
wherein the channel is a first channel of a plurality of channels, and
wherein the plurality of encryption modules are coupled to the buffer region of the non-volatile memory by the plurality of channels, respectively.

13. The operating method of claim 12,
wherein the plurality of channels include the first channel and a second channel,
wherein the plurality of encryption modules include the first encryption module and a second encryption module,
wherein the receiving of the decryption request comprises receiving, from the host, a first decryption request and a second decryption request for first encrypted data and second encrypted data, respectively, stored in the buffer memory,
wherein the performing of the decryption operation comprises:
    performing first decrypting including performing decryption by using the first encryption module based on a first physical address that corresponds to the first decryption request; and
    performing second decrypting including performing decryption by using the second encryption module based on a second physical address that corresponds to the second decryption request, and
wherein the first decrypting and the second decrypting are performed in parallel with each other.

14. The operating method of claim 12,
wherein the plurality of channels include the first channel and a second channel,
wherein the first encryption module is coupled to the buffer region of the non-volatile memory by the first channel,
wherein the operating method further comprises performing a memory operation including at least one of a data write operation, a data read operation, or an erase operation for the non-volatile memory by using the second channel,
wherein the performing of the decryption operation uses the first channel, and
wherein the performing of the decryption operation and the performing of the memory operation are performed in parallel with each other.

15. A data storage device comprising:
a buffer memory;
a non-volatile memory; and
a controller configured to receive an encryption request for data stored in the buffer memory from a host and to control an encryption operation in response to the received encryption request,
wherein, during the encryption operation within the controller,
a physical address of a buffer region of the non-volatile memory is received, encrypted data is generated by causing an encryption module included in the controller to be in an on state to encrypt the data stored in the buffer memory, the encrypted data is programmed in the buffer region of the non-volatile memory based on the physical address, the encrypted data is read from the buffer region of the non-volatile memory by causing the encryption module included in the controller to be in an off state, and the encrypted data read from the buffer region of the non-volatile memory is stored in the buffer memory without having been decrypted, wherein the controller includes the encryption module, is located between the buffer memory and the non-volatile memory, is configured to control a channel connecting the buffer memory and the buffer region of the non-volatile memory, and is configured to perform the encryption operation through interaction between the encryption module and the channel during data transmission between the buffer memory and the buffer region of the non-volatile memory, wherein the buffer region includes a page buffer included in the non-volatile memory, and wherein the buffer region is separate from the buffer memory.

16. The data storage device of claim 15, wherein the controller is further configured to receive a decryption request for the encrypted data stored in the buffer memory from the host and to control a decryption operation in response to the received decryption request, and wherein during the decryption operation, the physical address of the buffer region of the non-volatile memory is received, the encryption module included in the controller enters an off state, the encrypted data is programmed in the buffer region of the non-volatile memory based on the physical address, the encryption module enters an on state, decrypted data is generated by reading and decrypting the encrypted data from the buffer region of the non-volatile memory, and the decrypted data is stored in the buffer memory.

17. The data storage device of claim 16, wherein at least one of the encryption operation or the decryption operation is performed in a direct memory access (DMA) only program mode and a DMA only read mode.

18. The data storage device of claim 16, wherein the encryption module is a first encryption module of a plurality of encryption modules that are included in the controller, wherein the channel is a first channel of a plurality of channels, and wherein the plurality of encryption modules are coupled to the buffer region of the non-volatile memory by the plurality of channels, respectively.

19. The data storage device of claim 18, wherein the plurality of channels include the first channel and a second channel, wherein the plurality of encryption modules include the first encryption module and a second encryption module, wherein in response to receiving the encryption request and the decryption request from the host, the controller is configured to control the encryption operation by using the first encryption module and the first channel based on a first physical address that corresponds to the encryption request and to control the decryption operation by using the second encryption module and the second channel based on a second physical address that corresponds to the decryption request, and wherein the encryption operation and the decryption operation are performed in parallel with each other.

20. The data storage device of claim 18, wherein the plurality of channels include the first channel and a second channel, wherein the first encryption module is coupled to the buffer region of the non-volatile memory by the first channel, wherein in response to receiving the encryption request or the decryption request from the host, the controller is configured to control the encryption operation by using the encryption module and the first channel based on a first physical address or to control the decryption operation by using the first encryption module and the first channel based on the first physical address, and to control a memory operation including at least one of a data write operation, a data read operation, or an erase operation for the non-volatile memory by using the second channel, and wherein the encryption operation, or the decryption operation, and the memory operation are performed in parallel with each other.

* * * * *